United States Patent

Hoshino et al.

Patent Number: 5,273,824
Date of Patent: Dec. 28, 1993

[54] CORED MULTI-SHELL EMULSION PARTICLE

[75] Inventors: Futoshi Hoshino, Tokyo; Makoto Nakano, Chigasaki; Kousuke Someya; Junko Morita, both of Yokohama; Takeshi Yanagihara, Chigasaki; Akihiro Yamazaki, Yokohama, all of Japan

[73] Assignee: Mitsui Toatsu Chemicals, Incorporated, Tokyo, Japan

[21] Appl. No.: 648,785

[22] Filed: Feb. 1, 1991

[30] Foreign Application Priority Data

Feb. 3, 1990 [JP] Japan ............... 2-023645
Jun. 22, 1990 [JP] Japan ............... 2-162870
Sep. 20, 1990 [JP] Japan ............... 2-248760
Jan. 29, 1991 [JP] Japan ............... 3-026678

[51] Int. Cl.$^5$ ................. C08J 9/28; C08F 265/04
[52] U.S. Cl. ................. 428/402.24; 523/201; 521/54; 521/57; 521/64; 525/902; 106/14; 106/5; 106/409; 503/207
[58] Field of Search ............ 523/201; 525/902; 521/54, 57, 64; 106/409, 14.5; 503/207; 428/402.24

[56] References Cited

U.S. PATENT DOCUMENTS

| | | | |
|---|---|---|---|
| 4,427,836 | 1/1984 | Kowalski et al. | 525/301 |
| 4,594,363 | 6/1986 | Blankenship et al. | 521/64 |
| 4,880,842 | 11/1989 | Kowalski et al. | 521/64 |
| 4,970,241 | 11/1990 | Kowalski et al. | 521/57 |
| 4,972,000 | 11/1990 | Kawashima et al. | 521/54 |
| 4,985,064 | 1/1991 | Redlich et al. | 428/402.24 X |
| 4,985,469 | 1/1991 | Chip et al. | 521/64 |
| 5,041,464 | 8/1991 | Hoshino et al. | 521/65 |
| 5,094,998 | 3/1992 | Hoshino et al. | 503/207 |
| 5,157,084 | 10/1992 | Lee et al. | 523/301 |
| 5,206,299 | 4/1993 | Oshima et al. | 525/305 |
| 5,216,044 | 6/1993 | Hoshino et al. | 523/201 |
| 5,221,713 | 6/1993 | Kempner et al. | 525/902 X |
| 5,229,209 | 7/1993 | Gharapetian et al. | 428/403 |

Primary Examiner—Robert L. Stoll
Assistant Examiner—John M. Cover
Attorney, Agent, or Firm—Millen, White, Zelano & Branigan

[57] ABSTRACT

A cored multi-shell emulsion particle consisting of a core particle, a void layer existing in the exterior of the core particle and a shell layer, each of which has a diameter of $\phi$, d and D, respectively, and the ratio of $\phi$, d and D is in the following range.

$$\phi/D = 0.1 - 0.6$$

$$d/D = 0.2 - 0.8 \ (d > \phi)$$

The particle exhibits excellent hiding power, brightness, gloss and thermal insulation property as an organic pigment without impairing drying ability and strength of coated layer.

25 Claims, 1 Drawing Sheet

CORED MULTI-SHELL EMULSION PARTICLE

BACKGROUND OF THE INVENTION a) Field of the Invention

The present invention relates to a cored multi-shell synthetic resin emulsion particle useful as an additive to a paper coating agent utilized for common coated papers, paper boards, lightweight coated papers, ultralightweight coated papers, art papers and cast coated papers, to a paint applied to wood, external and internal walls, and to a coating agent used for thermal recording materials of facsimile papers, thermal labels and other thermal recording papers, comprising a core particle and a void layer formed by drying the exterior of the core particles; and a resin composition for paper coating, a resin composition for paint and a thermal recording material comprising said particle.

b) Description of the Related Art

In recent years, various high molecular weight polymer particles have been studied as additives to coating agents.

The most commonly used particles are homogeneous and solid, emulsion-polymerized polystyrene particles having a diameter of 0.2 to 0.5 micron ($\mu$). For example, Japanese Patent Laid-Open No. 59741/'84 discloses a process wherein an unsaturated carboxylic acid and a vinyl monomer are copolymerized in the presence of an anionic surface active agent and/or a nonionic surface active agent to form a copolymer emulsion in which more than 90% of the particles have a diameter of 0.20 to 0.28$\mu$. It is also described therein that the emulsion particles can be used as an organic pigment in applications including paper coating, paints and thermal recording materials. The solid emulsion particles, however, have a common problem that hiding power, brightness and gloss are insufficient when used in an organic pigment and hence no practical advantage is obtained unless they are used in a large amount.

In order to improve hiding power, brightness and gloss of the solid emulsion particles, an organic material which has pores after drying has recently been proposed as a substitute of the uniform and solid particle, for example, in U.S. Pat. No. 4,427,836 and Japanese Patent Laid-Open No. 62510/'86.

The former discloses a process for the preparation of an aqueous dispersion which comprises copolymerizing at least 5% of an unsaturated carboxylic acid to form a core material, adding at least one monoethylenically unsaturated sheath monomer, conducting emulsion polymerization to form a sheath polymer, neutralizing the resulting emulsion particles with an aqueous volatile base to swell the core polymer, thereby forming minute openings in the core by drying the particle.

The latter describes a process for the preparation of synthetic resin emulsion particles having empty pores in the interior by utilizing phase separation between different kinds of polymers in the polymerization reaction and volumetric shrinkage resulting from the polymerization.

The hollow particles produced by the above processes have improvements in hiding power, brightness and gloss as compared to conventional solid particles. The hollow particles, however, have following disadvantages, when applied to uses described below.

(1) The use of hollow particles as an organic pigment for paper coating:

The hollow particles are excellent in any of hiding power, brightness and gloss as compared to conventional solid particles. On the other hand, enhancement of performance in paper coating is more stringently required. Hence the hollow particles are generally used in the same range of amount as that of the solid particles. The procedure is effective to a certain extent for increasing hiding power, brightness and gloss. The procedure, however, decreases the strength of the coated layer and causes problems in printability.

Further, in a calender treatment conducted in order to increase gloss after applying a coating liquid, it is generally carried out to enhance flatness of the coated surface by increasing either or both of temperature and pressure. However, the conventional particles having empty pores only in the interior thereof are liable to collapse due to their empty structure leads to a serious decrease in hiding power and brightness. The decrease in strength in the coated layer and the deformation of the particles caused by heat and pressure also result in problems such as blocking or adhesion of dirt to the calender rolls, which circumstances is a serious disadvantage for practical use.

In order to improve the above disadvantages, counter measures such as change of particle diameter or change of void ratio in the interior of the particles having empty pores can be carried out. Pore size of about 0.22$\mu$ is needed to exhibit maximum hiding power, brightness an gloss (U.S. Pat. No. 4,427,836). Even though the void ratio in the interior of the particles is changed, preventing generation of blocking in the calender treatment and enhancing the strength of coated layer cannot be achieved.

As mentioned above, it has been difficult to obtain an organic pigment for paper coating using the particles having empty pores.

(2) The use of hollow particles in paints:

The hollow particles are excellent in hiding power and brightness as compared with conventional solid particles. However, as has been pointed out a disadvantage is that the hollow particles have slow emergence of hiding power and brightness in practical coating operation. Since the desired whiteness cannot be obtained immediately after application, workers make; and mistake of performing a recoat in excess and the resulting coated layer becomes thicker than desired or has an irregular thickness.

The phenomenon is also a problem which cannot be solved even though the particle diameter or the void ratio in the interior of the particles is changed as in the case of paper coating.

(3) The case of using for thermal recording materials:

As a result of recent progress in the diversification of information equipment, the thermal recording materials used are also required to improve the properties and defects such as coloring sensitivity, printing visibility, brightness, foreign matter adhesion to a thermal head, and sticking so as to meet high-speed recording and energy reduction in the thermal head and a hot pen.

Japanese Patent Laid-Open No. 86789/'80 has disclosed a method for obtaining a dense and distinct image by forming an intermediate layer containing synthetic resin particulates between a substrate and a thermally color-developing layer. The method, however, is difficult to obtain sensitivity enough to withstand high-speed recording required.

Japanese Patent Laid-Open No. 143683/'84 describes a method for adding styrene-base crosslinked particulates to a thermally color-developing layer in order to prevent foreign matter adhesion, sticking and color development by scratching pressure. With this method, however, it is still impossible to obtain a dense and distinct image and has no practical use.

In order to allow the heat of a thermal head to effectively act on a thermally color-developing layer, a method for obtaining a dense and distinct image by inserting between a substrate and a thermally color-developing layer an intermediate thermal-insulation layer containing thermoplastic particles having one empty pore in the interior of each particle has been disclosed, for example, in Japanese Patent Laid-Open Nos. 117787/'87 and 21180/'88.

However, the particles used in these method slow down the drying speed of the intermediate layer and cause problems such as workability in the successive coating of a thermally color-developing layer. The method does not overcome the problems of foreign matter adhesion on the thermal head and sticking. Further, hiding power and brightness of thermal recording material itself are still insufficient and cannot yet satisfy demand for high performance.

The problems mentioned above cannot be solved even though the diameter and the void ratio of the particle having an empty pore are changed as in the case of using for paints.

OBJECT AND SUMMARY OF THE INVENTION

It is an object of the present invention to provide a synthetic resin emulsion particle which is useful as an additive to coating compounds for paper coating, paints and thermal recording material.

It is another object of the present invention to provide a resin composition for use in paper coating, resin composition for paints, and thermal recording material.

It is still another object of the present invention to provide a core-shell structured emulsion particle having a low-density layer, a void layer in particular, formed by drying between a core particle and a shell particle.

It is a further object of the present invention to provide, when said emulsion particle is used as an organic pigment for paper coating, paints and thermal recording material, a particle which can simultaneously satisfy hiding power, brightness, gloss and other properties without impairing drying characteristics, strength of coated layer and coating workability, and a resin composition containing said particle.

It is a still further object of the present invention to provide a thermal recording material having a marked improvement in color-developing sensitivity, printing visibility, foreign matter adhesion to a head, and sticking.

Any of the above objects can be directly or indirectly accomplished by providing a cored multi-shell emulsion particle which forms layers of different refractive indexes, said particle having a diameter D of from 0.1 to 5.0μ and including therein a core particle and a void layer which exists in the exterior of said core particle, the ratio of the diameter $\phi$ of the core particle to D and the ratio of the diameter d of the void layer to D being in the range, respectively:

$\phi/D = 0.1 - 0.6$ $d/D = 0.2 - 0.8$ wherein $d > \phi$.

Some of the above objects can be accomplished by providing the above cored multi-shell emulsion particle obtained by the steps of conducting emulsion polymerization of a vinyl monomer (a) to obtain a polymer (A) as a core particle, adding thereto a vinyl monomer (b) which yields a polymer capable of swelling with an alkaline material, conducting emulsion polymerization to form an exterior layer composed of a polymer (B), followed by adding a vinyl monomer (c), conducting emulsion polymerization to form the polymer (C), treating a resulting multi-layer-structured emulsion particle with an alkaline material to swell the polymer (B), and drying the swelled particle thus obtained.

Other of the above objects can be accomplished by providing the above cored multi-shell emulsion particle obtained by further adding a vinyl monomer (d) after swelling the above polymer (B), conducting emulsion polymerization to form a polymer (D) as an exterior layer of the polymer (C), and drying the emulsion particle thus obtained.

Further, the present invention provides a process for preparing the above cored multi-shell emulsion particle composed of layers having different refractive indexes and also provides a resin composition for paper coating, and a resin composition for paints and thermal recording material by suitably formulating the cored multi-shell emulsion particle.

Figure 1:
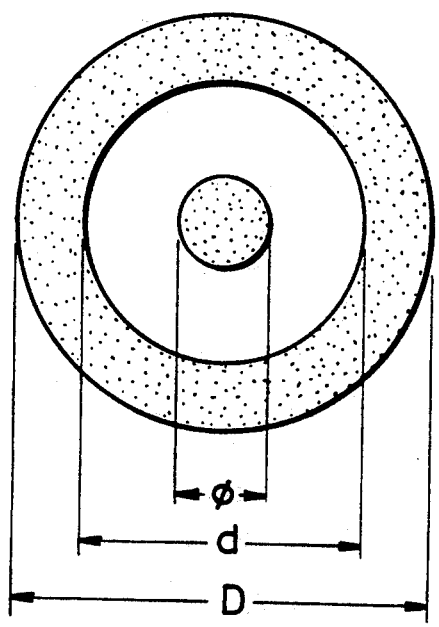
FIG. 1 is a sectional view schematically illustrating the internal structure of the cored multi-shell emulsion particle of the invention.

In the drawing, D is a diameter (outside diameter) of the particle, d is a diameter of an internal void layer, and $\phi$ is a diameter of the core particle.

DETAILED DESCRIPTION OF THE INVENTION

Preferred vinyl monomer (a) used for preparing the core particle composed of the polymer (A) makes it difficult to swell the polymer (A) by the alkaline material.

Exemplary vinyl monomer (a) includes a single monomer or a mixture thereof selected from acrylate esters such as butyl acrylate which have an alkyl group of at least 4 carbon atoms; methacrylate esters such as methyl methacrylate, ethyl methacrylate and butyl methacrylate; aromatic vinyl compounds such as styrene, α-methylstyrene and vinyl toluene; vinyl cyano compounds such as acrylonitrile; halogenated vinyl compounds such as vinyl chloride and vinylidene chloride; and butadiene.

A functional monomer is used, if necessary, in order to provide stability for the emulsion. The functional monomer which can be used includes, for example, unsaturated carboxylic acids such as (meth)acrylic acid, crotonic acid and itaconic acid; salts of unsaturated sulfonic acids such as sodium styrenesulfonate; (meth)acrylate esters such as 2-hydroxyethyl (meth)acrylate and glycidyl (meth)acrylate; and acryl amides such as (meth)acrylamide and N-methylol(meth)acrylamide.

The amount of the functional monomer used is in the range of usually from 0 to 5% by weight, preferably from 0.1 to 5% by weight. When the amount is more than 5% by weight, the polymer (A) is also liable to swell in the treatment with the alkaline material and it becomes difficult to form the core particle in the interior of the cored multi-shell emulsion particle finally obtained. On the other hand, an amount lower than 0.1% by weight leads to unstable emulsion of the core particle.

The vinyl monomer (a) which constitutes polymer (A) contains an unsaturated carboxylic acid, unsaturated carboxylic acid anhydride, vinyl ester compound and an acrylate ester having an alkyl group of 1 to 3 carbon atoms in a total amount of 3% by weight or less.

Further, a crosslinking monomer can be added, if necessary. The crosslinking monomer used is a compound which can be copolymerized with the above monomer (a) to achieve crosslinking and includes, for example, divinylbenzene, ethylene glycol di(meth)acrylate, trimethylolpropane tri(meth)acrylate and other monomers having at least two polymerizable unsaturated bonds in the molecule.

The amount of the crosslinking monomer added is in the range of usually from 0 to 10% by weight, preferably from 0.1 to 5% by weight of the above vinyl monomer (a). When the amount is more than 10% by weight, aggregate is liable to occur in the polymerization step. On the other hand, when the amount is less than 0.1% by weight, the below described effect cannot be obtained. That is, application of the crosslinkable monomer increases the molecular weight of the core-forming polymer (A) and inhibits diffusion of the exterior-layer constituting polymer (B) into the interior of the core particle. Thus, the polymer (B) can suitably form the exterior layer of the core particle.

The core portion composed of polymer (A) optically plays an important role as a scattering portion for increasing hiding power, brightness and gloss of the particle by scattering and reflecting the light beam which has entered into the particle by passing through the void.

In order to scatter and reflect the entered light beam, the polymer (A) is required to have a refractive index of 1.45 or more, preferably 1.48 or more, more preferably 1.50 or more. When the refractive index is less than 1.45, scattering and reflection of the light beam at the core particle portion are weak and the desired hiding power, brightness and gloss cannot be obtained.

The shape of the particle is preferably a sphere.

No particular limitation is imposed upon the glass transition temperature of the polymer (A). Particularly in the case of being contained in the paper coating resin composition, the glass transition temperature is preferably 50° C. or above, more preferably 80° C. or above. Alternatively, it is preferred to incorporate a crosslinked structure into the polymer (A) by using the crosslinking monomer.

Poor heat-resistance of the polymer (A) tends to cause accompanied deformation of the core particle when the emulsion particle is deformed by heat and pressure, for example, in a calender treatment of a paper coating process. Thereby it becomes difficult to control the deformation of the whole particle by the core particle existing in the particle and leads to decrease in hiding power and brightness.

In view of the above points, the vinyl monomer (a) constituting the polymer (A) is preferably a combination of an aromatic vinyl monomer such as styrene and a functional monomer for providing stability. Admixture of a crosslinking monomer such as divinylbenzene to the above combination is most preferred in order to further provide heat resistance.

The vinyl monomer (b) which forms the polymer (B) as the exterior layer of the above polymer (A) comprises a single monomer or a mixture thereof selected from the group consisting of monomers forms a hydrophilic or readily hydrolyzable polymer including unsaturated carboxylic acids such as acrylic acid, methacrylic acid, crotonic acid, fumaric acid, itaconic acid, alkyl maleate and alkyl fumalate; unsaturated carboxylic acid anhydrides such as maleic anhydride; vinyl ester compounds such as vinyl acetate; and acrylate ester compounds having an alkyl group of 1 to 3 carbon atoms. The total amount of these monomers is in the range of usually from 5 to 80% by weight, preferably from 10 to 50% by weight, more preferably from 15 to 35% by weight.

When the amount of the monomer which forms a hydrophilic or readily hydrolyzable polymer in monomer (b) is less than 5% by weight, it does not sufficiently swell in the hydrolysis treatment and substantially enough void layer cannot be formed. On the other hand, when the amount is more than 80% by weight, the stability of the polymerization reaction is impaired and formation of the exterior layer by the polymer (C) becomes difficult.

A combination of the above monomers can be optionally employed. It is preferred to use as a single monomer or a mixture thereof selected from the following groups:

[I] acrylic acid and methacrylic acid in the group which swells upon contact with the alkaline material,

[II] vinyl acetate and methyl acrylate in the group which causes partial hydrolysis upon contact with the alkaline material and swells, and [III] readily hydrolyzable monomers other than the above.

Other vinyl monomers (b) to be polymerized in combination with the above monomers include, for example, a single compound or a mixture thereof selected from acrylate esters having an alkyl group of at least 4 carbon atoms such as butyl acrylate; methacrylate esters such as methyl methacrylate and butyl methacrylate; aromatic vinyl compounds such as styrene, α-methylstyrene and vinyltoluene; vinyl cyano compounds such as (meth)acrylonitrile; halogenated vinyl compounds such as vinyl chloride and vinylidene chloride; and diene compounds such as butadiene.

In order to provide stability to the emulsion, unsaturated sulfonic acid salts such as sodium styrene-sulfonate; unsaturated alkaline compounds such as dimethylaminoethyl methacrylate; (meth)acrylate esters such as 2-hydroxyethyl (meth)acrylate and glycidyl (meth)acrylate; unsaturated amides such as (meth)acrylamide and N-methylol(meth)acrylamide; and other functional monomers can be used.

A crosslinking monomer can be used, if necessary. Crosslinking monomers copolymerizable with monomer (b) include, for example, divinyl benzene, ethylene glycol di(meth)acrylate, trimethylolpropane trimethacrylate and other monomers having at least two polymerizable unsaturated bonds in a molecule.

The amount of the crosslinking monomer added is in an amount of usually 0 to 2% by weight of vinyl monomer (b). Use of the crosslinking monomer increases molecular weight of polymer (B) forming the exterior layer of core portion and prevents polymer (C) which forms the most exterior layer from diffusing into the interior of the particle. Thereby the polymer (C) is favorably formed on the most outside portion of the particle. However, use of more than 2% by weight inhibits swelling of polymer (B) in the alkaline treatment.

After forming the polymer (B) a the exterior layer of the core particle composed of the above polymer (A), vinyl monomer (c) is further added and emulsion polymerization is carried out to form polymer (C) as the exterior layer of polymer (B).

The vinyl monomers (c) used include, for example, a single compound or a combination thereof selected from aromatic vinyl compounds such as styrene, α-methylstyrene and vinyl-toluene; acrylate esters such as butyl acrylate which have an alkyl group of at least 4 carbon atoms; methacrylate esters such as methyl methacrylate and butyl methacrylate; vinyl cyano compounds such as (meth)acrylonitrile; halogenated vinyl compounds such as vinyl chloride and vinylidene chloride; and diene compounds such as butadiene.

In order to impart stability to the emulsion, unsaturated carboxylic acids such as (meth)acrylic acid, crotonic acid and itaconic acid; salts of unsaturated sulfonic acids such as sodium styrenesulfonate; (meth)acrylate esters such as 2-hydroxyethyl (meth)acrylate and glycidyl (meth)acrylate; unsaturated amides such as (meth)acrylamide and N-methylol(meth)acrylamide; and other functional monomers are used, when necessary, in an amount of 0 to 10% by weight.

In order to accelerate penetration of the alkaline material into the interior of the particle in the treatment with the below described alkaline material, unsaturated carboxylic acids can be used in an amount of usually 0 to 10% by weight of the above monomer (c). Application of the unsaturated carboxylic acids more than 10% by weight is unfavorable for practical use because an aggregate is apt to form, water resistance is lowered and viscosity increase is enhanced in the treatment with the alkaline material On an other hand, the amount less than 0.1% by weight cannot give sufficient acceleration effect.

Crosslinking monomer can be used when necessary. The crosslinking monomers copolymerizable with the above monomers (c) include, for example, divinylbenzene, ethylene glycol di(meth)acrylate, trimethylolpropane trimethacrylate and other monomers having at least two polymerizable unsaturated bonds in a molecule. The amount of the crosslinking monomer added is usually 0 to 3% by weight of vinyl monomer (c).

Use of the crosslinking monomer can improve resistance to blocking, heat and solvent. However, use of more than 3% by weight unfavorably inhibits swelling of the polymer (B) in the treatment with the alkaline material.

The above illustrated vinyl monomer (C) can be used in optional combination and the glass transition temperature of the polymer (C) obtained is preferably in the range of 50° C. or above, more preferably 70° C. or above.

Preparation of the above cored multi-shell emulsion particle can be carried out by emulsion polymerization process.

The emulsion polymerization is usually carried out in the presence of a surface active agent. The surface active agents for use in the present invention include, for example, a single agent or a combination thereof selected from anionic surface active agents such as sodium alkylbenzenesulfonate, sodium alkylsulfate, sodium dialkylsulfosuccinate and naphthalenesulfonic acid/formaldehyde condensate; and nonionic surface active agents such as polyoxyethylene alkyl ether, polyoxyethylene alkylphenol ether, ethylene oxide/propylene oxide block copolymer and sorbitan fatty acid ester. In the case of applying said emulsion particle to thermal recording materials, use of anionic surface active agents is preferred because these agents do not inhibit coloration in a color-developing layer and prevent discoloration of developed color.

No particular limitation is imposed upon the amount of the surface active agent. The amount is usually 0.1 to 10% by weight of the monomer used for each layer.

Any kind of polymerization initiator which is commonly used in emulsion polymerization processes can be used for the present invention. Representative polymerization initiators include persulfates such as potassium persulfate, sodium persulfate and ammonium persulfate; organic peroxides such as benzoyl hydroperoxide; and azo compound such as azobisisobutyronitrile. The polymerization initiator can be used, if desired, in the form of a redox type initiator, in combination with a reducing agent.

In the preparation of a core particle emulsion of polymer (A), polymerization is carried out by adding various monomers at one time, in portions or continuously as a stream of droplets in the presence of the above mentioned surface active agent, polymerization initiator. The polymerization is carried out at a temperature of 20° to 90° C. in an atmosphere of nitrogen.

The thus-obtained core particle emulsion composed of polymer (A) is used as seed particles and polymerization is further carried by successibly adding vinyl monomer (b) and vinyl monomer (c) at one time, in portions or continuously.

Alternatively, the core particle emulsion composed of polymer (A) may be previously prepared in a separate step. The core particle emulsion thus prepared is charged as seed particles to another polymerization vessel. The vinyl monomer (b) and vinyl monomer (c) may be added sequentially as above to carry out polymerization. In the polymerization step, vinyl monomer (c) is preferably added after almost finishing polymerization of the vinyl monomer (b) and is then polymerized. When desired, after completing polymerization of vinyl monomer (b), the resulting emulsion is charged to a different polymerization vessel, vinyl monomer (c) is added and polymerization may be further carried out.

Preparation of polymers (A), (B) and (C) may be carried out continuously in one step, respectively in a separate step or in a combined step. No particular restriction is placed on these preparation steps.

The emulsion polymer obtained as above is treated with the alkaline material to give the desired particle, that is, the cored multi-shell emulsion particle having a core particle therein and generating void layer between said core particle and the shell particle by drying.

Exemplary alkaline materials used for the invention include inorganic alkaline materials such as potassium hydroxide and sodium hydroxide; volatile alkaline materials such as ammonia; and organic alkaline materials such as dimethylethanolamine and triethylamine.

The pH in treating with the alkaline material is in the range of from 7 to 13, preferably 8 to 12. When the pH is less than 7 in the treatment, swelling does not occur and the cored multi-shell emulsion particle having a sufficient void layer cannot be obtained. When the pH is higher than 13, stability of the emulsion in the treatment is seriously impaired and the treatment cannot be smoothly carried out.

In order to obtain the cored multi-shell emulsion particle within a short time, a temperature above 100° C. can also be used. Temperature of the treatment is usually 50° C. or above, preferably from 70° to 100° C., more preferably from 80° to 95° C. A temperature lower than 50° C. does not cause sufficient swelling and cannot give the cored multi-shell emulsion particle desired.

In the treatment, alcohols such as methyl alcohol, ethyl alcohol and isopropyl alcohol can also be added.

After treatment with the above alkaline material, vinyl monomer (d) is further added and emulsion polymerization can also be carried out to form polymer (D) as the exterior layer of polymer (C).

The vinyl monomer (d) used include, for example, a single compound or a combination thereof selected from aromatic vinyl compounds such as styrene, α-methylstyrene and vinyltoluene; acrylate esters such as butyl acrylate which have an alkyl group of at least 4 carbon atoms; methacrylate esters such as methyl methacrylate and butyl methacrylate; vinyl cyano compounds such as (meth)acrylonitrile; halogenated vinyl compounds such as vinyl chloride and vinylidene chloride; and diene compounds such as butadiene.

In order to provide stability for the emulsion, unsaturated carboxylic acids such as (meth)acrylic acid, crotonic acid and itaconic acid; salts of unsaturated sulfonic acids such as sodium styrenesulfonate; (meth)acrylate esters such as 2-hydroxyethyl (meth)acrylate and glycidyl (meth)acrylate; unsaturated amides such as (meth)acrylamide and N-methylol(meth)acrylamide; and other functional monomers are used, in an amount of 0 to 10% by weight. Use of the functional monomers in an amount more than 10% by weight leads to problems on the water resistance of the particle.

Further, a crosslinking monomer can be used, if desired. The crosslinking monomers copolymerizable with the above monomers (d) include, for example, divinylbenzene, ethylene glycol di(meth)acrylate, trimethylolpropane trimethacrylate and other monomers having at least two polymerizable unsaturated bonds in a molecule. The amount of the crosslinking monomer added is usually 0 to 20% by weight of vinyl monomer (d). Use of the crosslinking monomer can improve heat resistance and other properties. However, use of more than 20% by weight inhibits normal progress of the polymerization reaction and aggregate formation is apt to occur.

The above monomers can be used in optional combination. In order to enhance scattering and reflection of light beam, polymer (D) forming the most outside layer of the particle has preferably a high refractive index of at least 1.48, more preferably at least 1.57.

In view of the above refractive index, the vinyl monomer used for forming polymer (D) is preferably a mixture of an aromatic vinyl monomer such as styrene and a functional monomer and more preferably a mixture obtained by the addition to these monomers from 0 to 20 parts by weight of a crosslinking monomer such as divinylbenzene.

A component adhesive to other materials can be introduced onto the surface of the particle. For example, monomer (d) consisting of an aromatic vinyl monomer such as styrene, butadiene and a functional monomer can increase the strength of coated layer particularly in the paper coating field.

The difference in refractive index between layers (C) and (D) which constitute the shell particle also contributes to increase scattering of light beam. The refractive index of layer (D) is more preferably larger than that of layer (C).

No particular limitation is put on the glass transition temperature of polymer (D).

Polymerization of monomer (d) is carried out by the emulsion polymerization process mentioned above.

The emulsion particle obtained by the above process is dried to give the cored multi-shell emulsion particle having a core particle in the interior thereof and a void layer between the shell particles and said core particle.

The formation of a cored multi-shell emulsion particle can be confirmed with ease by observing the particle itself or a section of the particle under an electron microscope.

The cored multi-shell emulsion particle obtained in the invention has a particle diameter D in the range of usually from 0.1 to 5.0μ, preferably from 0.3 to 4.0μ. The more preferred diameter of the particle depends upon its uses and is in the range of from 0.5 to 2.0μ as a pigment for use in paints and paper coating and in the range of from 0.5 to 3.0μ as a thermal recording material.

When the diameter of the particle is less than 0.1μ, the particle cannot be used as an organic pigment for coating materials because of considerably lower hiding power and brightness, even though the interior of the particle has the above structure. The particle also cannot be used for thermal recording material because of color-developing sensitivity, foreign matter on a head and sticking in addition to the above problems. On the other hand, the particle having an outside diameter of more than 5μ cannot be consistently prepared.

The ratio of the diameter $\phi$ of the core particle to D and the ratio of a diameter d of the void layer to D are respectively in the range:

$\phi/D = 0.1 - 0.6$ $d/D = 0.2 - 0.8$ wherein $d > \phi$, preferably in the range:

$/D = 0.2 - 0.4$ $d/D = 0.4 - 0.8$ wherein $d > \phi$.

When d/D is less than 0.1, the diameter of the void layer is too small and the desired hiding power, brightness, gloss and color-developing sensitivity cannot be obtained. On the other hand, a d/D exceeding 0.8 leads to a very thin exterior layer and the cored multi-shell emulsion particle having a stable void layer is difficult to obtain.

A $\phi/D$ less than 0.1 leads to a decrease in the scattering strength of a light beam in the core particle portion because of too small a diameter of the core particle and the desired hiding power, brightness and gloss cannot be obtained. On the other hand, a $\phi/D$ exceeding 0.6 results in too large a volume of the core particle and superiority to solid particles cannot be found in hiding power, brightness, gloss and color-developing sensitivity.

Practical dimensions of the core particle diameter $\phi$ and the void layer diameter d are calculated from the ratio to the particle diameter D mentioned above.

$\phi$ is in the range of generally from 0.01 to 3.0μ, preferably from 0.02 to 2.0μ. Particularly in the case of using as a pigment for paints and paper coating, $\phi$ is preferably in the range of from 0.1 to 1.0μ, more preferably from 0.1 to 0.5μ in view of light scattering effect.

d is in the range of generally from 0.02 to 4.0μ, preferably from 0.06 to 3.2μ. In the case of using as a pigment for paints and paper coating, d is preferably in the range of from 0.2 to 2.0μ, more preferably from 0.3 to 1.2μ in view of light scattering effect similar to the above φ. In the case of using for thermal recording material, d is in the range of preferably from 0.3 to 2.5μ, more preferably from 0.5 to 2.0μ in view of color-developing sensitivity, brightness and prevention from foreign matter adhesion to a head.

The particle of the invention has superior hiding power, brightness and gloss to those of a hollow emulsion particle having an empty pore in the interior of the particle. The scattering and reflection of light beam in such hollow particle having the empty pore occur on the outside surface of the particle and the inside surface of the empty pore. On the other hand, with the particle of the invention it is presumed that additional scattering and reflection occur on the surface of the core particle which exists in the interior of the void layer.

The void layer which is between the core particle and the shell particle is determined by the relative positions of the core particle and the shell particle. For example, FIG. 1 illustrates the core particle as located at the center of the shell particle. The core particle may however be displaced from the center.

The void layer can be obtained by drying the emulsion particle in the swelled state of the polymer (B). hence, the polymer (B) exists in said void layer at a very low density. The polymer (B) is presumed to partially graft during polymerization on the polymer (A) constituting the core particle. Consequently, the core particle is thought to exist in a partially fixed state in the inside of the void layer without making into overall contact with the inside surface of the shell particle.

There is also possibility of deforming the spherical shape of the particle in practical usage such as heat treatment. However, no particular restriction is imposed on the schematic illustration in FIG. 1.

As a result, the cored multi-shell emulsion particle of the invention exhibits very excellent performance due to its novel particle form. When the particle is used as a pigment for a resin composition of paints and paper coating or a thermal recording material, hiding power, brightness, gloss and thermal insulation property can be markedly increased. Accordingly, a portion of the titanium dioxide in the composition and a portion or the whole of pigments such as kaolin and calcium carbonate can be limited.

The resin composition for paints, the resin composition for paper coating and the thermal recording material obtained by using the cored multi-shell emulsion particle prepared as above will be illustrated hereinafter.

The resin composition for paints of the invention comprises a binder, inorganic fillers, pigments and the cored multi-shell emulsion particle and, if desired, film-forming additives, plasticizers, thickening agents, pigment dispersants, antifreezing agents, pH regulators, anti-foaming agents, antiseptic agents, wetting agents and other various additives can be added.

No particular restriction is put on the binder so long as it will integrate the fillers and pigments. The composition for paints is required to have higher water resistance as compared with the paper coating composition described below. Preferred binders are hence water dispersion type binders such as acrylic-base synthetic resin emulsion, acrylic-styrene-base synthetic resin emulsion, vinyl acetate-base synthetic resin emulsion and styrene-butadiene-base synthetic resin latex.

Inorganic fillers and pigments include, for example, clay, kaolin, calcium carbonate and titanium dioxide.

The resin composition for paints containing an organic pigment composed of the cored multi-shell emulsion particle of the invention can employ a single compound or a combination selected from the above inorganic fillers and pigments and preferably uses titanium dioxide in view of its hiding power and brightness.

The proportion of the cored multi-shell emulsion particle in the pigment is from 1 to 90% by weight, preferably from 3 to 80% by weight. The addition less than 1% by weight cannot give expected hiding power, brightness and gloss. On an other hand, the amount exceeding 90% by weight lowers hiding power and brightness as compared with titanium dioxide alone.

The content of the above pigment in the paint resin composition which contains the binder and the cored multi-shell emulsion particle is from 15 to 90% by weight, preferably from 25 to 80% by weight. A content of the pigment less than 15% by weight cannot give desired hiding power and brightness. On the other hand, a content exceeding 90% by weight cannot give a coated film suitable for practical use.

Various additives can be added as described above to the paint resin composition containing the cored multi-shell emulsion particle of the invention. Exemplary additives include film forming agents such as cellosolve, butylcellosolve, carbitol, butylcarbitol, cellosolve acetate and texanol; plasticizers such as dioctyl phthalate and dioctyl adipate pigment dispersants such as polycarboxylic acid salts; thickeners such as hydroxyethylcellulose and carboxymethylcellulose; and antifreezing agents such as ethylene glycol and propylene glycol.

The pH is maintained 7 or above in order to stabilize the paints. Preferred bases for controlling the pH are ammonia, trimethylamine, 2-amino-2-methyl propanol and other volatile bases in view of water resistance of coated film.

The resin composition for paints which contains the cored multi-shell emulsion particle of the invention can be diluted, if necessary, with water and applied by conventional processes such as brushing, roller coating and spray coating.

The resin composition for paints containing the cored multi-shell emulsion particle thus obtained in the invention is characterized in excellent hiding power, brightness and gloss without impairing workability in coating. The composition can be used for woods, external walls and internal walls.

The paper-coating resin composition of the invention, including binders, inorganic fillers, pigments and the cored multi-shell emulsion particle as an organic pigment, and dispersants and bluing agents can be added, when necessary.

Exemplary binders include aqueous dispersion type binders such as styrene-butadiene-base synthetic resin latex, acrylic-base synthetic resin emulsion, acrylic-styrene-base synthetic resin emulsion and vinyl acetate-base synthetic resin emulsion; and aqueous solution type binders such as starch, modified starch, casein and polyvinyl alcohol. These binders are used alone or in combination. Preferred binder is styrene-butadiene-base synthetic resin latex alone or in combination with starch or casein in view of hiding power, brightness and gloss.

The amount of the binder used is in the range of usually from 4 to 30% by weight, preferably from 6 to 20% by weight of the total pigment containing the cored multi-shell emulsion particle. An amount of the binder less than 4% by weight cannot give coated layer having practical strength. On the other hand, an amount exceeding 30% by weight cannot give desired hiding power, brightness and gloss.

Useful inorganic fillers include, for example, a single compound or a mixture thereof selected from clay, calcium carbonate, talc, satin white and titanium dioxide.

No particular limitation is imposed upon the amount of the cored multi-shell emulsion particle so long as the amount is at least 1% by weight of the total pigment. The amount is in the range of preferably from 2 to 70% by weight, more preferably from 3 to 30% by weight. An amount of the cored multi-shell emulsion particle less than 1% by weight cannot exhibit the effect of addition.

As mentioned above, in blending the binder with the pigment, the pH is controlled to 7 or above by the addition of a base in order to stabilize the blended system. Preferred bases are sodium hydroxide, potassium hydroxide and other non-volatile bases in view of viscosity.

The paper coating resin composition containing the cored multi-shell emulsion particle of the invention is applied to papers and paper boards. Application is carried out by conventional methods using a gate roll coater, air knife coater and a blade coater.

The thus-obtained paper coating resin composition containing the cored multi-shell emulsion particle of the invention can eliminate blocking in the calender treatment and reduction of hiding power and brightness and is characterized in that hiding power, brightness and gloss are excellent and the strength of the coated layer is not impaired.

The above composition can be used for common coated papers, paper boards, lightweight coated papers, ultra-lightweight coated papers, art papers and cast coated papers.

The constitution of the thermal recording material is usually classified into various kinds such as a paper or plastic-sheet substrate having thereon a thermally color-developing layer alone, a substrate having thereon at least one intermediate layer inserted between the substrate and the thermally color-developing layer, and a substrate having a top coat layer on the thermally color-developing layer. No particular restriction is, however, imposed on the position of the layer containing the cored multi-shell emulsion particle of the invention.

In order to provide a thermal insulation property and improve color-developing sensitivity, it is preferred to include said emulsion particle in the intermediate layer. In order to prevent foreign matter adhesion to a thermal head, inclusion of said particle in the thermally heat-developing layer and/or in the intermediate layer to enhance oil absorption. Inclusion of the particle in any layer can improve brightness of the thermal recording materials.

Coloring materials for use in the thermal recording layer include, for example, fluoran-base colorless dye, triarylmethane-base dye, phenothiazine base dye and other basic colorless dyes. Developers used include, for example, phenolic compounds and aromatic carboxylic acids. The ratio of the developer to the coloring agent in the thermally color-developing layer is usually in the range of 1 to 30 parts by weight of the developer per part by weight of the coloring agent. The binder is usually used in an amount of 30 parts by weight per 100 parts by weight of the sum of developer and coloring agent.

Binders are selected from organic high molecular weight compounds including, for example, aqueous dispersions such as styrene-butadiene base latex and acrylic-base emulsion; aqueous solutions of polyvinyl alcohol, starch and hydroxyethylcellulose; and mixtures thereof.

The coloring agent and the developer which are used in the thermal recording layer of the invention are separately dispersed by wet milling with a ball mill in the presence of a dispersion stabilizer. To the dispersion thus obtained, the above binder and, if desired, the cored multi-shell emulsion particle are added in an amount of 0 to 300 parts by weight, preferably 0 to 200 parts by weight per 100 parts by weight of the sum of the coloring agent and the developer. An addition exceeding 300 parts by weight improves brightness and oil absorption, whereas the concentration of the coloring agent and the developer is decreased in the layer and color-developing sensitivity and printing visibility are lowered.

The blended liquid obtained above is further mixed, if necessary, with inorganic pigments such as calcium carbonate, magnesium carbonate, talc and kaolin; ultraviolet absorbers such as benzophenone derivatives and triazole derivatives; and sensitizers such as waxes and fatty acid amides to obtain a formulated liquid used for the thermal recording layer.

The formulated liquid for the thermal recording layer is applied and dried so as to obtain a coated thickness after drying of 1 to 20 g/m$^2$ or a dried film thickness of 2 to 10$\mu$.

In the case of inserting the intermediate layer between the substrate and the above thermally color-developing layer, a formulation for forming the intermediate layer is applied on the substrate and dried prior to formation of the thermally color-developing layer. The formulation to form the intermediate layer comprises a binder composed of organic high-molecular weight compounds, the cored multi-shell emulsion particle of the invention and, when desired, inorganic fillers such as calcium carbonate and calcined clay.

The amount of the cored multi-shell emulsion particle of the invention in the intermediate layer is in the range of 20 to 90 parts by weight, preferably 30 to 80 parts by weight. An amount less than 20 parts by weight cannot form effective intraparticlar and interparticlar openings and leads to poor color-developing sensitivity and an unfavorable increase in sticking and foreign matter adhesion. On the other hand, an amount of the particle exceeding 90 parts by weight results in too small amount of the binder and leads to a decrease in the strength of the intermediate layer itself and the adhesive strength between the substrate and the intermediat layer. Consequently, the resulting thermal recording material cannot be employed for practical use.

Binders are selected, for example, from aqueous dispersions such as styrene-butadiene-base latex and acrylic-base emulsion; aqueous solutions of polyvinyl alcohol, starch and hydroxyethyl cellulose; and mixtures thereof. The amount of the binder used varies depending upon the amount of the above cored multi-shell emulsion particle and optionally added inorganic filler. The amount is in the range of usually from 5 to 30 parts by weight, preferably from 10 to 25 parts by weight. Suitable range in the amount of the binder is based on the same reason as that of the above cored multi-shell procedures except that composition of the vinyl monomer (a) was changed. Results are illustrated in Table 1.

TABLE 1

| Core particle No. | Composition of vinyl monomer (a) | | | | | | | Particle diameter $\phi$ ($\mu$) | Refraction index na | Tg (A) (°C.) |
|---|---|---|---|---|---|---|---|---|---|---|
| | MMA | ST | BA | MAc | AA | HEMA | DVB | | | |
| 1 | 20 | | 79 | 1 | | | 0.5 | 0.12 | 1.47 | −32 |
| 2 | | 97.5 | | | 0.5 | 2 | | 0.17 | 1.59 | 100 |
| 3 | 95 | | | 2 | | 3 | 2 | 0.09 | 1.52 | 106 |
| *4 | | 92.5 | 5 | 2 | | 0.5 | | 0.27 | 1.58 | 89 |
| 5 | | 98 | | | | 2 | 5 | 0.18 | 1.59 | 100 |
| 6 | 30 | | 50 | 20 | | | | 0.10 | 1.48 | 15 |
| 7 | 40 | | 30 | 30 | | | | 0.14 | 1.49 | 57 |
| *8 | 43 | | 25 | 30 | | 2 | | 0.24 | 1.49 | 68 |

*No. 4 & 8: 0.5 wt. % of the total emulsion was initially charged and polymerized for 30 minutes.
MMA: Methyl methacrylate
ST: Styrene
BA: Butyl acrylate
MAc: Methacrylic acid
AA: Acrylic acid
HEMA: 2-Hydroxyethyl methacrylate
DVB: Divinylbenzene emulsion particle.

The amount of optionally added inorganic fillers is 20 parts by weight or less, preferably 10 parts by weight or less. An addition exceeding 20 parts by weight disturbs particle configuration regularly constituted to the cored multi-shell emulsion particle itself becomes dominant. Thus, the desired thermal re cording material having high sensitivity cannot be obtained.

An undercoat layer is usually applied so as to obtain a coating amount after drying of 5 to 15 g/m² or a dry film thickness of 5 to 15μ.

The thus-obtained thermal recording material comprising the cored multi-shell emulsion particle of the invention is excellent in color-developing sensitivity and color density and, further, has a dominant printability without sticking and foreign matter adhesion to a thermal head.

The present invention will hereinafter be illustrated in detail by way of examples; however, the invention is not intended to be limited to the specific embodiments. Part and % indicates part by weight and % by weight.

POLYMERIZATION EXAMPLE

Preparation of Core Particle

Core Particle Emulsion-1

To a separable flask equipped with a stirrer, thermometer and a reflux condenser, 365 parts of water were charged and heated to 70° C. with stirring while replacing the atmosphere with nitrogen. The internal temperature was maintained at 70° C., 0.4 part of potassium persulfate was added as a polymerization initiator and dissolved.

An emulsion was previously prepared by adding with stirring 79 parts of butyl acrylate, 20 parts of methyl methacrylate, 1 part of methacrylic acid and 0.5 part of divinylbenzene to a solution of 0.05 part of sodium dodecyl sulfate in 40 parts of water.

To the above separable flask, 5% of the total amount of the emulsion thus obtained was charged and polymerized for 30 minutes. Thereafter residual emulsion was added over about 2 hours and reacted. After finishing addition the reaction mixture was aged for 2 hours to prepare a core-particle emulsion The core-particle emulsion had a non-volatile content of about 20% and particle diameter $\phi$ of 0.12μ (core particle No. 1). Emulsions were prepared by carrying out the same Refractive index n and glass transition temperature Tg of the polymer were calculated from the following equation by using refractive index Ni and glass transition temperature Tgi of each homopolymer (described in J. Brandrup and E. H. Immergut, Polymer Handbook 2nd Ed., John Willey & Sons, 1975) and weight fraction Xi of each monomer added in the polymerization.

$$n = \Sigma X_i N_i$$

$$(1/Tg) = \Sigma(X_i/Tg_i)$$

Preparation of Cored Multi-Shell Emulsion Polymer [1]

Polymerization Example 1

To the same separable flask as used in the preparation of core particle, 62.5 parts of the above core particle emulsion-1 and 600 parts of water were charged and warmed to 75° C. with stirring while replacing the atmosphere with nitrogen. The internal temperature was maintained at 75°, 1.0 part of ammonium persulfate was added as a polymerization initiator and dissolved.

An emulsion was previously prepared by adding 60 parts of methyl methacrylate, 10 parts of butyl acrylate, 30 parts of methacrylic acid and 0.1 part of divinylbenzene with stirring to a solution of 0.4 part of sodium dodecyl sulfate in 40 parts of water.

The emulsion thus prepared was added to the above flask continuously over 3 hours, reacted and aged for 2 hours after finishing the addition.

An emulsion was previously prepared by adding 675 parts of methyl methacrylate, 180 parts of styrene, 36 parts of methacrylic acid and 9 parts of acrylamide with stirring to a solution of 1.8 parts of sodium dodecyl sulfate in 720 parts of water.

The emulsion thus obtained was successively and continuously added to the above reaction mixture over 4 hours, reacted and further aged for 2 hours after finishing the addition.

After finishing polymerization, the internal temperature was raised to 90° C., 150 parts of a 10% aqueous sodium hydroxide solution were added with stirring, and stirring was continued for 1 hour at the same temperature. The pH of the emulsion was 10.5.

The emulsion thus obtained had a non-volatile content of about 40%, particle diameter D of 0.50μ, core particle diameter φ in the particle of 0.15μ and a void layer diameter d of 0.30μ.

The polymer (C) thus obtained had calculated values of 108° C. and 1.51, respectively, in glass transition temperature and refractive index.

Polymerization Examples 2-5

The core particle emulsion-1 was used as described in Polymerization Example 1. The same amount of the vinyl monomer (b) as in Polymerization Example 1 was added. Only the composition of the vinyl monomer (b) was varied as illustrated in Table 2 and the same procedures were carried out as described in Polymerization Example 1. Results are illustrated in Table 2.

sion-1 in Polymerization Example 1 (in Polymerization Example 1, the amount of the core particle emulsion was 62.5 parts). In Polymerization Example 15, the same procedures as Polymerization Example 14 was conducted by using the same composition of the vinyl monomer (b) as that in Polymerization Example 5. Polymerization Example 16 was carried out by using 160 parts of the core particle emulsion 1 and by repeating the same procedures as Polymerization Example 1. Results are illustrated in Table 4.

TABLE 3

| Polymerization Example | Core particle No. | Composition of vinyl monomer (c) | | | | | | | D (μ) | d (μ) | φ (μ) | d/D | φ/D | Refractive index nc | Tg (°C.) |
|---|---|---|---|---|---|---|---|---|---|---|---|---|---|---|---|
| | | MMA | ST | BA | MAc | AA | AM | DVB | | | | | | | |
| 6 | 1 | | 756 | 90 | 54 | | | 0.9 | 0.51 | 0.30 | 0.14 | 0.59 | 0.27 | 1.57 | 81 |
| 7 | 1 | 513 | 360 | | 18 | | 9 | | 0.54 | 0.31 | 0.16 | 0.57 | 0.30 | 1.53 | 105 |
| *8 | 1 | 555 | 270 | 30 | 45 | | | | 0.60 | 0.38 | 0.16 | 0.63 | 0.27 | 1.52 | 99 |
| *9 | 1 | 885 | | | | 9 | 6 | 4.5 | 0.56 | 0.34 | 0.15 | 0.61 | 0.27 | 1.49 | 105 |
| 10 | 1 | 337.5 | 90 | | 18 | | | 4.5 | 0.40 | 0.30 | 0.15 | 0.75 | 0.38 | 1.51 | 107 |
| Referential Example | | | | | | | | | | | | | | | |
| **5 | 1 | | 630 | 90 | 180 | | | 0.9 | 0.39 | — | — | — | — | 1.56 | 93 |
| 6 | 1 | 513 | 360 | | 18 | | 9 | 45 | 0.47 | — | — | — | — | 1.54 | 105 |

*Polymerization Examples 8 and 9: 28% aqueous ammonia was used in alkaline treatment.
**Referential Example 5: Viscosity was increased in alkaline treatment.

TABLE 2

| | Core particle No. | Composition of vinyl monomer (b) | | | | | | | D (μ) | d (μ) | φ (μ) | d/D | φ/D |
|---|---|---|---|---|---|---|---|---|---|---|---|---|---|
| | | MMA | BA | EA | AN | MAc | HEMA | DVB | | | | | |
| Polymerization Example | | | | | | | | | | | | | |
| 1 | 1 | 60 | 10 | | | 30 | | 0.1 | 0.50 | 0.30 | 0.15 | 0.60 | 0.30 |
| 2 | 1 | | 20 | 30 | 10 | 40 | | 0.2 | 0.56 | 0.34 | 0.14 | 0.61 | 0.25 |
| 3 | 1 | 70 | | 10 | | 15 | 5 | | 0.48 | 0.39 | 0.19 | 0.60 | 0.40 |
| 4 | 1 | | 40 | | | 60 | | 0.5 | 0.57 | 0.36 | 0.15 | 0.63 | 0.26 |
| 5 | 1 | 50 | 32 | | 5 | 8 | 5 | 0.1 | 0.43 | 0.26 | 0.22 | 0.60 | 0.51 |
| Referential Example | | | | | | | | | | | | | |
| 1 | 1 | 84 | 10 | | | 1 | 5 | 0.1 | 0.43 | — | — | — | — |
| *2 | 1 | 5 | 10 | | 85 | | | 0.1 | — | — | — | — | — |
| 3 | 1 | 60 | 10 | | | 30 | | 5 | 0.42 | 0.32 | 0.30 | 0.76 | 0.71 |
| **4 | 1 | 60 | 10 | | | 30 | | 0.1 | 0.41 | — | — | — | — |

*Referential Example 2: Viscosity was increased during polymerization and emulsion could not be obtained.
**Referential Example 4: Alkaline treatment was conducted at 20° C.

Polymerization Examples 6-10

The core particle emulsion-1 was used as described in Polymerization Example 1. The same amounts of vinyl monomer (c) was used. Only the composition of the vinyl monomer (c) was varied as illustrated in Table 3 and the same procedures were carried out as described in Polymerization Example 1. Results are illustrated in Table 3 as Polymerization Examples 6-9. The results obtained by using a half amount of the vinyl monomer (c) in Polymerization Example 1 is illustrated in Table 3 as Polymerization Example 10.

Polymerization Examples 11-16

Polymerization Examples 11-13 were carried out by the same procedures as described in Polymerization Example 1 except that core particles other than No. 1 in Table 1 were used. Polymerization Example 14 was carried out by using 10 parts of the core particle emul-

TABLE 4

| Polymerization Example | Core particle No. | D (μ) | d (μ) | φ (μ) | d/D | φ/D |
|---|---|---|---|---|---|---|
| 11 | 2 | 0.59 | 0.37 | 0.17 | 0.63 | 0.29 |
| 12 | 3 | 0.48 | 0.29 | 0.10 | 0.60 | 0.21 |
| 13 | 4 | 1.48 | 1.09 | 0.29 | 0.74 | 0.19 |
| *14 | 1 | 1.12 | 0.73 | 0.13 | 0.65 | 0.12 |
| *15 | 1 | 0.98 | 0.28 | 0.24 | 0.29 | 0.24 |
| *16 | 1 | 0.34 | 0.25 | 0.19 | 0.74 | 0.56 |
| Referential Example | | | | | | |
| **7 | 6 | 0.54 | 0.33 | — | 0.61 | — |

*Polymerization Example 14: 10 parts of core material emulsion was used.
*Polymerization Example 15: The same as above, and vinyl monomer (b) was the same as Poly. Ex. 5.
*Polymerization Example 16: The same as above. 160 parts was used.
**Referential Example 7: No core particle.

Referential Examples 1-4

The procedures of Polymerization Example 1 were changed as follows.

Referential Example 1 was conducted by using 1 part of methacrylic acid in the vinyl polymer (b).

Referential Example 2 was conducted by using 85 parts of methacrylic acid.

Referential Example 3 was conducted by using 5% of divinylbenzene as a crosslinking monomer.

Referential Example 4 conducted treatment with alkaline material at 20° C. Results are illustrated in Table 2.

Referential Examples 5-6

Referential Example 5 was carried out by the same procedures as described in Polymerization Example 6 except that 20% of methacrylic acid was contained in the vinyl monomer (c).

Referential Example 6 was carried out by the same procedures as described in Polymerization Example 7 except that divinylbenzene wa used in 5% of the vinyl monomer (c). Results are illustrated in Table 3.

Referential Example 7

The same procedures as described in Polymerization Example 1 were carried out except that core particle emulsion-6 was used. Results are illustrated in Table 4.

Polymerization Example 17

To the same separable flask as used in preparing the core particle, 100 parts of the emulsion prepared in Polymerization Example 1 and 110 parts of water were charged, and warmed to 75° C. with stirring while replacing the atmosphere with nitrogen. The internal temperature was maintained at 75° C., 0.5 part of ammonium persulfate was added as a polymerization initiator and dissolved.

An emulsion was previously prepared by adding 99 parts of styrene, 1 part of 2-hydroxyethyl methacrylate and 0.1 part of divinylbenzene with stirring to a solution of 0.4 part of sodium dodecyl sulfate in 40 parts of water.

The emulsion thus prepared was added to the above flask continuously over 3 hours, reacted and aged for 2 hours after finishing the addition.

The emulsion thus obtained had a non-volatile content of about 40%, a particle diameter D of 0.81μ, a core particle diameter φ of 0.15μ and a void layer diameter of 0.43μ.

Polymerization Examples 18-19

In Polymerization Example 17, the composition of monomer (d) was changed as illustrated in Table 5. Results obtained ar illustrated in Table 5.

Polymerization Example 20

To the same separable flask as used in the preparation of core particle, 137.3 parts of the above core particle emulsion-5 and 959 parts of water were charged and warmed to 78° C. with stirring while replacing the atmosphere with nitrogen. The internal temperature was maintained at 78° C., 0.1 part of ammonium persulfate was added as a polymerization initiator and dissolved.

An emulsion was previously prepared by adding 12.4 parts of methyl methacrylate and 4.1 parts of methacrylic acid to a solution of 0.1 part of sodium dodecyl sulfate in 9.6 parts of water.

The emulsion thus prepared was added to the above flask continuously over 3 hours to carry out the reaction and aged for 2 hours after finishing the addition.

Successively, 0.9 part of ammonium persulfate was added again and dissolved.

An emulsion was previously prepared by adding 140 parts of methyl methacrylate, 31.5 parts of styrene and 3.5 parts of methacrylic acid with stirring to a solution of 0.6 part of sodium dodecyl sulfate in 72 parts of water.

The emulsion thus obtained was successively and continuously added to the above reaction mixture over 2 hours to carry out the reaction and further aged for 2 hours after finishing the reaction. The polymer (C) had a calculated glass transition temperature of 106° C.

After completing the polymerization, the internal temperature was raised to 90° C., 13.9 parts of 28% aqueous ammonia were added with stirring to adjust the pH to 10.2, and stirring was continued for 10 minutes. Successively, 4.4 parts of ammonium persulfate was added again at 90° C. and dissolved.

An emulsion previously obtained by dispersing 870 parts of styrene and 9 parts of acrylamide in a solution of 3.6 parts of sodium dodecyl sulfate in 360 parts of water was continuously added to the above reaction mixture over 2 hours to carry out the reaction and aged for 2 hours after finishing the addition.

The emulsion thus obtained had a non-volatile content of 42%, particle diameter D of 0.69μ, core particle diameter φ of 0.18μ and a void layer diameter d of 0.50μ.

Polymerization Examples 21-26

The same procedures as described in Polymerization Example 20 were carried out in Polymerization Examples 21-23 except that the core particle emulsion was changed.

In Polymerization Example 24, the vinyl monomer (d) in Polymerization Example 20 was changed to 861 parts of styrene, 9 parts of 2-hydroxyethyl methacrylate and 9 parts of divinylbenzene.

In polymerization Example 25, the vinyl monomer (d) was changed to 825 parts of methyl methacrylate, 45 parts of butyl acrylate and 9 parts of 2-hydroxyethyl methacrylate.

In Polymerization Example 26, treatment with an alkaline material in Polymerization Example 20 was carried out at pH 9. Results are illustrated in Table 6.

TABLE 5

| | Core particle No. | Composition of vinyl monomer (c) | | | | | | D (μ) | d (μ) | φ (μ) | d/D | φ/D | Refractive index nd |
|---|---|---|---|---|---|---|---|---|---|---|---|---|---|
| | | ST | MMA | BA | AN | HEMA | AM | DVB | | | | | | |
| Polymerization Example | | | | | | | | | | | | | | |
| 17 | 1 | 99 | | | | 1 | | 0.1 | 0.88 | 0.53 | 0.15 | 0.60 | 0.17 | 1.59 |
| 18 | 1 | | 78 | 10 | 10 | 2 | | 0.5 | 0.80 | 0.41 | 0.15 | 0.51 | 0.19 | 1.49 |
| 19 | 1 | 54 | | 40 | 5 | | 1 | | 0.81 | 0.46 | 0.15 | 0.57 | 0.19 | 1.53 |

Referential Examples 8-12

In Referential Examples 8-10, the core particle emulsion used in Polymerization Example 20 was changed.

In Referential Example 11, the composition of vinyl monomer (b) in Polymerization Example 20 was changed to 19.2 parts of methyl methacrylate, 1.8 parts of butyl acrylate and 0.9 part of 2-hydroxyethyl methacrylate.

In Referential Example 12, the core particle emulsion used in Referential Example 11 was changed. Results are illustrated in Table 6.

Polymerization Example 27

The composition of vinyl monomer (d) in Polymerization Example 20 was changed to 780 parts of styrene, 90 parts of butadiene and 9 parts of 2-hydroxyethyl methacrylate.

Polymerization was carried out in an autoclave equipped with an stirrer and replaced with nitrogen gas. The monomer (d) was added over 10 hours and further aged for 5 hours after finishing the addition. Other reaction conditions ware the same as Polymerization Example 20. Results are illustrated in Table 6.

Referential Examples 13-14

Referential Example 13 was carried out by the same procedures as described in Polymerization Example 27 except that the same core particle emulsion as used in Referential Example 9 was used.

Referential Example 14 was carried out by the same procedures as described in Polymerization Example 27 except that the composition of the vinyl monomer (b) was changed to the same as described in Referential Example 11. Results are illustrated in Table 6.

As seen in Table 5, in the case of polymerizing monomer (d) after treatment with the alkaline material, the diameter d of the void layer is liable to increase when the principal component of monomer (d) is styrene in particular (Polymerization Examples 17 and 19).

The reason is considered to be that shrinkage of the particle in the drying step due to the evaporation of included water in the particle is inhibited by reinforcing the exterior portion.

Preparation of Cored Multi-shell Emulsion Particle [II]

Polymerization Example 28

To the same separable flask as used in the preparation of core particle, 62.5 parts of the above core particle emulsion-5 and 600 parts of water were charged and warmed to 75° C. with stirring while replacing the atmosphere with nitrogen. The internal temperature was maintained at 75° C., 1.0 part of ammonium persulfate was added as a polymerization initiator and dissolved.

An emulsion was previously prepared by adding 61 parts of methyl methacrylate, 10 parts of butyl acrylate, 25 parts of vinyl acetate and 4 parts of methacrylic acid with stirring to a solution of 0.4 part of sodium dodecyl sulfate in 40 parts of water.

The emulsion thus prepared was added to the above flask continuously over 3 hours to carry out the reaction and aged for 2 hours after finishing the addition.

An emulsion was previously prepared by adding 810 parts of methyl methacrylate, 45 parts of styrene, 36 parts of methacrylic acid and 9 parts of acrylamide with stirring to a solution of 1.8 parts of sodium dodecyl sulfate in 720 parts of water.

The emulsion thus obtained was successively and continuously added to the above reaction mixture over 5 hours to carry out the reaction and further aged for 2 hours after finishing the addition.

After finishing polymerization, the internal temperature was raised to 90° C., 210 parts of a 10% aqueous sodium hydroxide solution was added with stirring, and stirring was continued for 3 hours at the same temperature. The pH of the emulsion was 11.7.

The emulsion thus obtained had a non-volatile content of about 39%, particle diameter D of 0.60$\mu$, core particle diameter $\phi$ in the particle of 0.19$\mu$ and a void layer diameter d of 0.35$\mu$.

The polymer (C) thus obtained had calculated values of 109° C. and 1.50, respectively, in glass transition temperature and refractive index.

Polymerization Examples 29-30

The core particle emulsion-5 was used as described in Polymerization Example 28. The same amount of vinyl

TABLE 6

| | Core particle No. | D ($\mu$) | d ($\mu$) | $\phi$ ($\mu$) | d/D | $\phi$/D | Refractive index na | nc | nd |
|---|---|---|---|---|---|---|---|---|---|
| Polymerization Example | | | | | | | | | |
| 20 | 5 | 0.69 | 0.50 | 0.18 | 0.72 | 0.26 | 1.59 | 1.51 | 1.59 |
| 21 | 2 | 0.65 | 0.46 | 0.17 | 0.71 | 0.26 | 1.59 | 1.51 | 1.59 |
| 22 | 4 | 1.11 | 0.84 | 0.28 | 0.76 | 0.25 | 1.58 | 1.51 | 1.59 |
| 23 | 1 | 0.46 | 0.31 | 0.15 | 0.67 | 0.33 | 1.47 | 1.51 | 1.59 |
| 24 | 5 | 0.68 | 0.48 | 0.18 | 0.71 | 0.26 | 1.59 | 1.51 | 1.59 |
| 25 | 5 | 0.60 | 0.35 | 0.18 | 0.58 | 0.30 | 1.59 | 1.51 | 1.49 |
| 26 | 5 | 0.65 | 0.39 | 0.19 | 0.60 | 0.29 | 1.59 | 1.51 | 1.59 |
| 27 | 5 | 0.66 | 0.42 | 0.18 | 0.64 | 0.27 | 1.59 | 1.51 | 1.58 |
| Referential Example | | | | | | | | | |
| *8 | 6 | 0.46 | 0.28 | — | 0.61 | — | 1.48 | 1.51 | 1.59 |
| *9 | 7 | 0.69 | 0.44 | — | 0.64 | — | 1.49 | 1.51 | 1.59 |
| **10 | 8 | — | — | — | — | — | 1.49 | 1.51 | 1.59 |
| ***11 | 5 | 0.65 | — | — | — | — | 1.59 | 1.49 | 1.59 |
| ***12 | 3 | 0.34 | — | — | — | — | 1.52 | 1.49 | 1.59 |
| *13 | 7 | 0.62 | 0.36 | — | 0.58 | — | 1.49 | 1.51 | 1.58 |
| ***14 | 5 | 0.65 | — | — | — | — | 1.59 | 1.49 | 1.58 |

*Referential Examples 8-9 and 13: No core particle.
**Referential Example 10: Viscosity was increased during treatment with alkaline material. Whole system was gelled.
***Referential Examples 11-12 and 14: No void layer (solid particle).

monomer (b) as in Polymerization Example 28 was added. Only the composition of the vinyl monomer (b) was varied as illustrated in Table 7 and the same procedures were carried out as described in Polymerization Example 28. Results are illustrated in Table 7.

TABLE 7

| | Core particle No. | Composition of vinyl monomer (b) | | | | | | | | D (μ) | d (μ) | φ (μ) | d/D | φ/D |
|---|---|---|---|---|---|---|---|---|---|---|---|---|---|---|
| | | MMA | BA | EA | MA | VAc | MAc | HEMA | DVB | | | | | |
| Polymerization Example | | | | | | | | | | | | | | |
| 28 | 5 | 61 | 10 | | | 25 | 4 | | | 0.60 | 0.35 | 0.19 | 0.58 | 0.32 |
| 29 | 5 | 34 | 20 | | | 50 | 3 | 1 | 0.2 | 0.62 | 0.37 | 0.18 | 0.60 | 0.29 |
| 30 | 5 | 50 | 5 | | 40 | | 3 | 2 | 0.1 | 0.59 | 0.34 | 0.20 | 0.58 | 0.34 |
| 31 | 5 | 80 | 2 | 3 | 10 | | 4 | 1 | | 0.56 | 0.29 | 0.21 | 0.52 | 0.38 |
| 32 | 5 | 41 | 10 | 30 | | 15 | 1 | 3 | | 0.57 | 0.32 | 0.20 | 0.56 | 0.35 |
| Referential Example | | | | | | | | | | | | | | |
| 15 | 5 | 84 | 10 | | | 2 | 4 | | | 0.53 | — | — | — | — |
| 16 | 5 | | | | | 100 | | | | 0.52 | — | — | — | — |
| 17 | 5 | 61 | 10 | | | 25 | 4 | | 5 | 0.54 | 0.42 | 0.39 | 0.78 | 0.72 |
| 18 | 5 | 61 | 10 | | | 25 | 4 | | | 0.53 | — | — | — | — |

Polymerization Examples 33-34

The core particle emulsion-5 was used as described in Polymerization Example 28. The same amount of vinyl monomer (c) was used. Only the composition of the vinyl monomer (c) was varied as illustrated in Table 8. Results are illustrated in Table 8.

TABLE 8

| | Core particle No. | Composition of vinyl monomer (c) | | | | | | | D (μ) | d (μ) | φ (μ) | d/D | φ/D | Refractive index nc | Tg (C) (°C.) |
|---|---|---|---|---|---|---|---|---|---|---|---|---|---|---|---|
| | | MMA | ST | BA | MAc | AA | AM | DVB | | | | | | | |
| Polymerization Example | | | | | | | | | | | | | | | |
| 33 | 5 | 792 | 45 | | 63 | | | | 0.62 | 0.38 | 0.18 | 0.61 | 0.29 | 1.50 | 111 |
| 34 | 5 | 810 | | 45 | 18 | 18 | 9 | 3 | 0.61 | 0.35 | 0.20 | 0.57 | 0.33 | 1.49 | 94 |
| Referential Example | | | | | | | | | | | | | | | |
| *19 | 5 | 675 | 45 | | 180 | | | | 0.43 | — | — | — | — | 1.50 | 124 |
| 20 | 5 | 810 | | 45 | 18 | 18 | 9 | 45 | 0.53 | — | — | — | — | 1.50 | 94 |

Polymerization Examples 35-41

Polymerization Examples 35-37 were carried out by the same procedures as described in Polymerization Example 30 except that core particles other than No. 5 in Table 1 were used. The same procedures as described in Polymerization Example 28 were carried out in Polymerization Example 38 by using ammonia as an alkaline material, and in Polymerization Example 39 by adding 50 parts of methyl alcohol in the treatment with an alkaline material.

Polymerization Example 40 was carried out by using 10 parts of the core particle emulsion-5 in Polymerization Example 29 (in Polymerization Example 29, the amount of the core particle emulsion was 62.5 parts). Polymerization Example 41 was conducted by using 130 parts of the core particle emulsion-5. Results are illustrated on Table 9.

TABLE 9

| | Core particle No. | D (μ) | d (μ) | φ (μ) | d/D | φ/D |
|---|---|---|---|---|---|---|
| Polymerization Example | | | | | | |
| 35 | 3 | 0.31 | 0.15 | 0.10 | 0.48 | 0.32 |
| 36 | 4 | 1.13 | 0.75 | 0.30 | 0.66 | 0.27 |
| 37 | 1 | 0.45 | 0.25 | 0.13 | 0.56 | 0.29 |
| 38 | 5 | 0.59 | 0.32 | 0.20 | 0.54 | 0.34 |
| *39 | 5 | 0.62 | 0.38 | 0.19 | 0.61 | 0.31 |
| *40 | 5 | 1.03 | 0.63 | 0.20 | 0.61 | 0.19 |
| *41 | 5 | 0.47 | 0.25 | 0.18 | 0.53 | 0.38 |
| Referential example | | | | | | |
| **21 | | 7 | 0.61 | 0.38 | — | 0.62 | — |
| **22 | | 8 | 1.15 | 0.77 | — | 0.67 | — |

*Polymerization Example 39: 50 parts of methyl alcohol is added in alkali treatment.
*Polymerization Example 40: 10 parts of core particle emulsion is used.
*Polymerization Example 41: 130 parts of core particle emulsion is used.
**Referential Example 21-22: No core particle.

Referential Examples 15-18

The procedures of Polymerization Example 28 were changed as follows.

Referential Example 15 was conducted using 2 parts of vinyl acetate in the vinyl polymer (b).

Referential Example 16 was conducted using parts of vinyl acetate.

Referential Example 17 was conducted using 5% of divinylbenzene as a crosslinking monomer in vinyl monomer (b).

Referential Example 18 was conducted by treating with alkaline material at 20° C. Results are illustrated in Table 7.

Referential Examples 19-20

Referential Example 19 was carried out by the same procedures as described in Polymerization Example 33 except that 20% of methacrylic acid was contained in the vinyl monomer (c).

Referential Example 20 was carried out by the same procedures as described in Polymerization Example 34 except that divinylbenzene was used in 5% of the vinyl monomer (c). Results are illustrated in Table 8.

Referential Examples 21–22

The same procedures as described in Polymerization Example 28 were carried out except that core particle emulsion-7 and 8 were used. Results are illustrated in Table 9.

Polymerization Example 42

To the same separable flask as used in preparing the core particle, 50 parts of the emulsion prepared in Polymerization Example 28 and 110 parts of water were charged, and warmed to 85° C. with stirring while replacing the atmosphere with nitrogen. The internal temperature was maintained at 85° C., 0.5 part of ammonium persulfate was added as a polymerization initiator and dissolved. An emulsion was previously prepared by adding 99 parts of styrene and 1 part of acrylamide with stirring to a solution of 0.4 part of sodium dodecyl sulfate in 40 parts of water.

The emulsion thus prepared was added to the above flask continuously over 3 hours, reacted and aged for 2 hours after finishing the addition.

The emulsion thus obtained had a non-volatile content of about 40%, a particle diameter D of 1.20μ, a core particle diameter φ of 0.19μ and a void layer diameter d of 0.41μ.

Polymerization Examples 43–45

The emulsions respectively prepared in Polymerization Examples 30, 35 and 36 were used. Results obtained by varying the composition of the vinyl monomer (d) are illustrated in Table 10.

An emulsion was previously prepared by adding 147 parts of methyl methacrylate, 21 parts of styrene and 7 parts of methacrylic acid with stirring to a solution of 0.6 part of sodium dodecyl sulfate in 72 parts of water.

The emulsion thus obtained was successively and continuously added to the above reaction mixture over 2 hours to carry out the reaction and further aged for 2 hours after finishing the reaction. The polymer (C) had a calculated glass transition temperature of 108° C.

After completing the polymerization, the internal temperature was raised to 90° C., 30 parts of 28% aqueous ammona were added with stirring to adjust the pH to 11.8, and stirring was continued for 7 hours.

Successively, 4.4 parts of ammonium persulfate were added again at 90° C. and dissolved.

An emulsion previously obtained by dispersing 870 parts of styrene and 9 parts of acrylamide in a solution of 3.6 parts of sodium dodecyl sulfate in 360 parts of water was continuously added to the above reaction mixture over 2 hours to carry out the reaction and aged for 2 hours after finishing the addition.

The emulsion thus obtained had a non-volatile content of 41%, particle diameter D of 0.66μ, core particle diameter φ of 0.20μ and a void layer diameter d of 0.44μ.

Polymerization Examples 47–49

Polymerization Example 47 was carried out by the same procedures as described in Polymerization Example 46 except that the core particle emulsion was changed.

Polymerization Example 48 was carried out by the same procedures as described in Polymerization Example 46 except that vinyl monomer (b) was changed to 9.9 parts of methyl methacrylate, 5.94 parts of vinyl acetate and 0.66 parts of methacrylic acid, the alkaline

TABLE 10

| Polymerization Example | Core particle No. Polymerization Example | Composition of vinyl monomer (c) | | | | | | | D (μ) | d (μ) | φ (μ) | d/D | φ/D | Refractive index nd |
|---|---|---|---|---|---|---|---|---|---|---|---|---|---|---|
| | | ST | MMA | BA | AN | HEMA | AM | DVB | | | | | | |
| 42 | 28 | 99 | | | | | 1 | | 1.20 | 0.41 | 0.19 | 0.34 | 0.16 | 1.59 |
| 43 | 30 | 88 | | | | 10 | 2 | | 1.17 | 0.43 | 0.20 | 0.37 | 0.17 | 1.58 |
| 44 | 35 | 70 | 13 | 15 | | 1 | 1 | | 0.61 | 0.25 | 0.10 | 0.41 | 0.16 | 1.56 |
| 45 | 36 | 35 | 60 | | | 3 | 2 | 0.1 | 2.12 | 0.80 | 0.30 | 0.38 | 0.14 | 1.50 |

Polymerization Example 46

To the same separable flask as used in the preparation of the core particle, 137.3 parts of the above core particle emulsion-5 and 959 parts of water were charged and warmed to 78° C. with stirring while replacing the atmosphere with nitrogen. The internal temperature was maintained at 78° C., 0.1 part of ammonium persulfate was added as a polymerization initiator and dissolved.

An emulsion was previously prepared by adding 9.9 parts of methyl methacrylate, 1.65 parts of butyl acrylate and 4.95 parts of methyl acrylate with stirring to a solution of 0.1 part of sodium dodecyl sulfate in 9.6 parts of water.

The emulsion thus prepared was added to the above flask continuously over 3 hours to carry out the reaction and aged for 2 hours after finishing the addition.

Successively, 0.9 part of ammonium persulfate was added again and dissolved.

material was changed to potassium hydroxide, and treatment was conducted for 4 hours at pH 12.5.

Polymerization Example 49 was carried out by the same procedures as described in Polymerization Example 48 except that vinyl monomer (d) was changed to 750 parts of methyl methacrylate, 100 parts of butyl acrylate, 20 parts of 2-hydroxyethyl methacrylate, 9 parts of acrylamide and 9 parts of divinylbenzene. Results are illustrated in Table 11.

Referential Examples 23–25

Comparative Example 23 was carried out by the same procedures as described in Polymerization Example 46 except that core particle emulsion was changed.

Comparative Example 24 was carried out by the same procedures as described in Polymerization Example 46 except that the composition of vinyl monomer (b) was changed to 14.52 parts of methyl methacrylate, 1.65 parts of butyl acrylate and 0.33 part of methyl acrylate.

Comparative Example 25 was carried out by the same procedures as described in Polymerization Example 47 except that treatment with the alkaline material was conducted at pH 7.2. Results are illustrated in Table 11.

Polymerization Example 50

The same procedures as described in Polymerization Example 48 were carried out except that the composition of the vinyl monomer (d) was changed to 780 parts of styrene, 90 parts of butadiene and 9 parts of acrylamide.

Polymerization was carried out in a nitrogen substituted autoclave equipped with a stirrer. The vinyl monomer (d) was added over 10 hours. After finishing the addition, aging was further carried out for 5 hours. Other reaction conditions were the same as Polymerization Example 48. Results are illustrated in Table 11.

After application, a period where hiding power is once decreased is observed in any examples. As already known, for example, in J. Watanabe and P. Lepoutre, J. Appl. Polym. Sci., Vol. 27, 4207 (1982), it is considered that film thickness is decreased in this period accompanied by the evaporation of moisture during the drying process and movement of binder and pigment particles is completely stopped in this period to reach a stable thickness of the film.

Example of Resin Composition for Paints

Paint formulations were prepared by using the particles obtained in the above Polymerization Examples and Referential Examples as organic pigments in place of a part of rutile type titanium dioxide. As a paint vehicle, an acrylic emulsion having a resin content of 45%, Trade Mark; Almatex E-208, was used. The formulation used for preparing these paints is illustrated in Table 13.

TABLE 11

| | Core particle No. | D ($\mu$) | d ($\mu$) | $\phi$ ($\mu$) | d/D | $\phi$/D | Refractive Index na | nc | nd |
|---|---|---|---|---|---|---|---|---|---|
| Polymerization Example | | | | | | | | | |
| 46 | 5 | 0.66 | 0.44 | 0.20 | 0.67 | 0.30 | 1.59 | 1.50 | 1.59 |
| 47 | 4 | 1.09 | 0.75 | 0.35 | 0.69 | 0.32 | 1.58 | 1.50 | 1.59 |
| 48 | 5 | 0.70 | 0.49 | 0.19 | 0.70 | 0.27 | 1.59 | 1.50 | 1.59 |
| 49 | 5 | 0.68 | 0.46 | 0.19 | 0.68 | 0.28 | 1.59 | 1.50 | 1.49 |
| 50 | 5 | 0.70 | 0.48 | 0.19 | 0.69 | 0.27 | 1.59 | 1.50 | 1.58 |
| Referential Example | | | | | | | | | |
| 23 | 7 | 0.65 | 0.43 | — | 0.66 | — | 1.47 | 1.50 | 1.59 |
| 24 | 5 | 0.59 | — | — | — | — | 1.59 | 1.50 | 1.59 |
| 25 | 4 | 0.96 | — | — | — | — | 1.58 | 1.50 | 1.59 |

The velocity for developing hiding power accompanied by drying was measured on the emulsion particle prepared above.

An acrylic base synthetic resin emulsion (Almatex E-269; manufactured by Mitsui Toatsu Chemicals Inc.) was used as a binder. The prepared emulsion particle was blended with the binder in a weight ratio of 3:7 and applied to a glass plate with an applicator bar so as to obtain a dry film thickness of 20$\mu$. The coated glass plate was allowed to stand at 20° C. under 60% relative humidity. The process of drying was visually evaluated with the passage of time. A No. 4 printing type was placed 1 cm behind the coated glass plate and visually observed through the glass plate. Evaluation results were expressed by the following four classes.

⊚: very good (Type cannot be seen.)
◯: Good (Type can been seen to a certain extent.)
△: Fair (Type can be seen.)
✕: Poor (Type can be clearly seen.)
Results are illustrated in Table 12.

TABLE 13

| | Part |
|---|---|
| Water | 45.0 |
| 25% Aqueous solution to Tamol 731 (Trade mark of a product from Rohm & Haas Co.) | 12.2 |
| Ethylene glycol | 40.0 |
| 2-Amino-2-methylpropanol | 3.0 |
| Nopco DF-122NS (Trade mark of a product from Sun Nopco Co.) | 0.8 |
| Rutile type titanium dioxide | 164.5 |
| 40% Emulsion prepared in Examples or Referential Examples | 102.8 |
| Almatex E-208 (Trade mark of a product from Mitsui Toatsu Chemicals Inc.) | 676.0 |
| ½ Solvent mixture of butyl cellosolve/ Texanol (Trade mark of a product from Eastman Kodak Co.) | 40.0 |
| 1/10 Solvent mixture of hydroxyethyl | 12.4 |

TABLE 12

| Time (min) | Polymerization Example | | | | | Referential Example | | | | |
|---|---|---|---|---|---|---|---|---|---|---|
| | 1 | 14 | 20 | 28 | 46 | 7 | 9 | 11 | 15 | 23 |
| 5 | △ | △ | △ | △ | △ | △ | △ | △ | △ | △ |
| 10 | △ | ✕ | △ | ✕ | △ | △ | △ | △ | △ | △ |
| 15 | ✕ | △ | ✕ | ◯ | ✕ | ✕ | ✕ | △ | △ | ✕ |
| 20 | △ | ◯ | △ | *⊚ | ◯ | △ | △ | *✕ | *✕ | △ |
| 25 | *⊚ | *⊚ | ◯ | ⊚ | *⊚ | △ | △ | ✕ | ✕ | △ |
| 30 | ⊚ | ⊚ | *⊚ | ⊚ | ⊚ | ◯ | △ | ✕ | ✕ | *◯ |
| 35 | ⊚ | ⊚ | ⊚ | ⊚ | ⊚ | ◯ | ◯ | ✕ | ✕ | ◯ |
| 40 | ⊚ | ⊚ | ⊚ | ⊚ | ⊚ | *◯ | ◯ | ✕ | ✕ | ◯ |
| 45 | ⊚ | ⊚ | ⊚ | ⊚ | ⊚ | ◯ | *◯ | ✕ | ✕ | ◯ |

*Indicates the time when visual opacity becomes constant.

TABLE 13-continued

| | Part |
|---|---|
| cellulose/propylene glycol | |
| Solid content of paint | 46.9% |
| PWC (% by weight of pigment content in solid) | 40.0% |
| Viscosity of paint | 70–80 KU |

Paints were prepared by charging water, Tamol 731, ethylene glycol, 2-amino-2-methylpropanol, Nopco DF-122NS and rutile type titanium dioxide into a pigment grinding mill and thoroughly dispersing these ingredients. Successively, an emulsion obtained in one of the Examples and Referential Examples, Almatex E-208, butyl cellosolve/Texanol and hydroxyethyl cellulose/propylene glycol were added with stirring. Viscosity of the paints was adjusted to 70 to 80 KU by using a Stomer viscometer.

The paints thus prepared were applied to slates so as to give a dry film thickness of about 40μ, and dried at room temperature for a week. Then, the performance of the test specimen thus obtained was evaluated by the following methods.

Gloss:
Measured at an angle of 75° with a glassmeter manufactured by Suga Testing Machine Co.

Hiding Power:
Measured in accordance with JIS K-5663. Using an applicator, a paint to be tested was applied to a sheet of hiding power test paper manufactured by Japan Test Panel Industrial Co. so as to give a dry film thickness of 75μ, and dried at room temperature for a week. Thereafter, hiding power was calculated from a 45°/0° reflectance ratio.

Water resistance:
The test specimen was submerged in water for 24 hours at room temperature. Thereafter appearance of the painted film was visually observed.
Absence of disorder such as blister and whitening was judged ◯.

Alkali resistance:
The test specimen was submerged in a 2% aqueous sodium hydroxide solution for 24 hours at room temperature. Thereafter appearance of the painted film was visually observed.
Absence of disorder such as blister and whitening was judged ◯.

Weather resistance:
The specimen was irradiated in a weather-o-meter for 500 hours. Thereafter appearance of the painted film was visually observed.
Absence of disorder such as blister, whitening and decrease in gloss was judged ◯.

Washability:
The specimen was tested in accordance with JIS K-5663.
No peel off of the painted film after washing more than 2000 times was judged ◯.
No peel off of the painted film after washing from 1000 to 2000 times was judged Δ.

Adherence:
The painted film was given a crosscut with a cutter-knife. A cellophane tape was adhered to the crosscut portion of the painted film and then peeled off.
No stripping of the painted film at the crosscut was judged ◯.
Some stripping of the painted film at the crosscut was judged Δ.

Results are illustrated in Tables 14(I) and 14(II).

TABLE 14(I)

| Application Example | Emulsion particle | TiO₂/Emulsion particle (W/W) | Gloss | Hiding power (%) | Water resistance | Alkali resistance | Weather resistance | Washability | Adherence |
|---|---|---|---|---|---|---|---|---|---|
| Example | Polym. Ex. | | | | | | | | |
| 1 - 1 | 1 | 80/20 | 88 | 98 | ◯ | ◯ | ◯ | ◯ | ◯ |
| 1 - 2 | 2 | 80/20 | 88 | 98 | ◯ | ◯ | ◯ | ◯ | ◯ |
| 1 - 3 | 3 | 80/20 | 88 | 97 | ◯ | ◯ | ◯ | ◯ | ◯ |
| 1 - 4 | 4 | 80/20 | 89 | 97 | ◯ | ◯ | ◯ | ◯ | ◯ |
| 1 - 5 | 5 | 80/20 | 88 | 97 | ◯ | ◯ | ◯ | ◯ | ◯ |
| 1 - 6 | 6 | 80/20 | 89 | 98 | ◯ | ◯ | ◯ | ◯ | ◯ |
| 1 - 7 | 7 | 80/20 | 88 | 98 | ◯ | ◯ | ◯ | ◯ | ◯ |
| 1 - 8 | 8 | 80/20 | 89 | 98 | ◯ | ◯ | ◯ | ◯ | ◯ |
| 1 - 9 | 9 | 80/20 | 87 | 95 | ◯ | ◯ | ◯ | ◯ | ◯ |
| 1 - 10 | 10 | 80/20 | 89 | 97 | ◯ | ◯ | ◯ | ◯ | ◯ |
| 1 - 11 | 11 | 80/20 | 88 | 98 | ◯ | ◯ | ◯ | ◯ | ◯ |
| 1 - 12 | 12 | 80/20 | 89 | 98 | ◯ | ◯ | ◯ | ◯ | ◯ |
| 1 - 13 | 13 | 80/20 | 86 | 94 | ◯ | ◯ | ◯ | ◯ | ◯ |
| 1 - 14 | 14 | 80/20 | 87 | 95 | ◯ | ◯ | ◯ | ◯ | ◯ |
| 1 - 15 | 15 | 80/20 | 85 | 93 | ◯ | ◯ | ◯ | ◯ | ◯ |
| 1 - 16 | 16 | 80/20 | 89 | 95 | ◯ | ◯ | ◯ | ◯ | ◯ |
| 1 - 17 | 17 | 80/20 | 88 | 97 | ◯ | ◯ | ◯ | ◯ | ◯ |
| 1 - 18 | 18 | 80/20 | 86 | 93 | ◯ | ◯ | ◯ | ◯ | ◯ |
| 1 - 19 | 19 | 80/20 | 88 | 97 | ◯ | ◯ | ◯ | ◯ | ◯ |
| 1 - 20 | 20 | 80/20 | 88 | 97 | ◯ | ◯ | ◯ | ◯ | ◯ |
| Ref. Ex. | Ref. Ex. | | | | | | | | |
| 1 - 1 | 1 | 80/20 | 80 | 89 | ◯ | ◯ | ◯ | ◯ | ◯ |
| 1 - 2 | 3 | 80/20 | 81 | 90 | ◯ | ◯ | ◯ | ◯ | ◯ |
| 1 - 3 | 4 | 80/20 | 80 | 89 | ◯ | ◯ | ◯ | ◯ | ◯ |
| 1 - 4 | 5 | 80/20 | 81 | 90 | X | X | ◯ | X | ◯ |
| 1 - 5 | 6 | 80/20 | 80 | 90 | ◯ | ◯ | ◯ | ◯ | ◯ |
| 1 - 6 | 7 | 80/20 | 84 | 92 | ◯ | ◯ | ◯ | ◯ | ◯ |
| 1 - 7 | 8 | 80/20 | 84 | 92 | ◯ | ◯ | ◯ | ◯ | ◯ |
| 1 - 8 | 9 | 80/20 | 82 | 91 | ◯ | ◯ | ◯ | ◯ | ◯ |
| 1 - 9 | 11 | 80/20 | 79 | 86 | ◯ | ◯ | ◯ | ◯ | ◯ |
| 1 - 10 | — | 100/0 | 79 | 99 | ◯ | ◯ | ◯ | ◯ | ◯ |

TABLE 14(II)

| Application Example | Emulsion particle | TiO2/Emulsion particle (W/W) | Gloss | Hiding power (%) | Water resistance | Alkali resistance | Weather resistance | Washability | Adherence |
|---|---|---|---|---|---|---|---|---|---|
| Example | Polym. Ex. | | | | | | | | |
| 1 - 21 | 28 | 80/20 | 86 | 96 | ○ | ○ | ○ | ○ | ○ |
| 1 - 22 | 30 | 80/20 | 86 | 96 | ○ | ○ | ○ | ○ | ○ |
| 1 - 23 | 31 | 80/20 | 85 | 93 | ○ | ○ | ○ | ○ | ○ |
| 1 - 24 | 33 | 80/20 | 87 | 96 | ○ | ○ | ○ | ○ | ○ |
| 1 - 25 | 35 | 80/20 | 86 | 93 | ○ | ○ | ○ | ○ | ○ |
| 1 - 26 | 36 | 80/20 | 86 | 95 | ○ | ○ | ○ | ○ | ○ |
| 1 - 27 | 37 | 80/20 | 85 | 93 | ○ | ○ | ○ | ○ | ○ |
| 1 - 28 | 38 | 80/20 | 85 | 95 | ○ | ○ | ○ | ○ | ○ |
| 1 - 29 | 39 | 80/20 | 87 | 97 | ○ | ○ | ○ | ○ | ○ |
| 1 - 30 | 40 | 80/20 | 84 | 93 | ○ | ○ | ○ | ○ | ○ |
| 1 - 31 | 41 | 80/20 | 86 | 94 | ○ | ○ | ○ | ○ | ○ |
| 1 - 32 | 42 | 80/20 | 84 | 95 | ○ | ○ | ○ | ○ | ○ |
| 1 - 33 | 44 | 80/20 | 86 | 95 | ○ | ○ | ○ | ○ | ○ |
| 1 - 34 | 45 | 80/20 | 85 | 94 | ○ | ○ | ○ | ○ | ○ |
| 1 - 35 | 46 | 80/20 | 87 | 97 | ○ | ○ | ○ | ○ | ○ |
| 1 - 36 | 48 | 80/20 | 88 | 98 | ○ | ○ | ○ | ○ | ○ |
| 1 - 37 | 49 | 80/20 | 85 | 95 | ○ | ○ | ○ | ○ | ○ |
| Ref. Ex. | Ref. Ex. | | | | | | | | |
| 1 - 11 | 15 | 80/20 | 79 | 88 | ○ | ○ | ○ | ○ | ○ |
| 1 - 12 | 16 | 80/20 | 78 | 86 | X | X | ○ | X | ○ |
| 1 - 13 | 17 | 80/20 | 80 | 88 | ○ | ○ | ○ | ○ | ○ |
| 1 - 14 | 21 | 80/20 | 83 | 91 | ○ | ○ | ○ | ○ | ○ |
| 1 - 15 | 22 | 80/20 | 81 | 89 | ○ | ○ | ○ | ○ | ○ |
| 1 - 16 | 23 | 80/20 | 83 | 92 | ○ | ○ | ○ | ○ | ○ |
| 1 - 17 | 25 | 80/20 | 79 | 89 | ○ | ○ | ○ | ○ | ○ |

EXAMPLE OF RESIN COMPOSITION FOR PAPER COATING

The performance of emulsions obtained in the above Polymerization Examples and Referential Examples were evaluated by two formulations as organic pigments for use in paper coating fluid. The formulation and evaluation procedures are illustrated below.

Evaluation-1

| Formulation | Part |
|---|---|
| UW-90 (Trade mark of a product from EMC Co.) | 90 |
| Pigment or filler | 10 |
| Aron T-40 (Trade mark of a product from Toagosei Chemical Ind.) | 0.09 |
| MS-4600 (Trade mark of a product from Nippon Food Industrial Co.) | 3 |
| Polylac 755 (Trade mark of a product from Mitsui Toatsu Chemicals Inc.) | 12 |
| Solid content of coating fluid | 62% |

The coating fluid was prepared by adding dispersant Aron T-40 having a solid content of 40% to water, sufficiently dispersing kaolin clay UW-90 with a Kaules mixer and further mixing with one of the emulsion obtained in Polymerization Examples and Referential Examples as an organic pigment.

For the purpose of comparison, titanium dioxide paste having a solid content of 62% (a product of Dainichi Seika Co.) was used as an inorganic pigment and precipitated calcium carbonate slurry TP-222HS having a solid content of 60% (a product of Okutama Industrial Co.) was used as an inorganic filler. Phosphated starch MS-4600 and Polylac 755 having a solid content of 50% were added as binders to obtain coating fluids.

Using an applicator, each of the above obtained coating fluids was applied to wood free paper so as to give a dry coating weight of 14 to 15 g/m² and then dried at 120° C. for 20 seconds. Thereafter, under such conditions as a roll temperature of 60° C., a linear pressure of 70 kg/cm and a speed of 10 m/min, the applied paper was passed twice through calender rolls to obtain a coated paper, and its performance was evaluated by the following methods.

Color viscosity:
Measured with a BM type viscometer at 60 r.p.m. by using a No. 4 rotor.

Gloss of coated paper:
Reflectance at an angle of 75° was measured in accordance with JIS P-8142.

Printed gloss
Using an RI printing tester, coated paper was printed with 0.4 cc of New Bright Indigo manufactured by Toyo Ink Co. After drying, reflectance at an angle of 75° was measured in accordance with JIS P-8142.

Brightness:
Measured with an RI printing tester in accordance with JIS P-8123.

Opacity:
Measured in accordance with JIS P-8138.

Dry pick:
Tested with an RI printing tester. In the evaluation, ten points were regarded as a full mark.

Wet pick:
Tested with an RI printing tester. In the evaluation, ten points were regarded as a full mark.

Results are illustrated in Table 15.

TABLE 15

| Application Example | Pigment or Filler | Color viscosity (cps) | Gloss of coated paper | Printed gloss | Brightness (%) | Capacity (%) | Dry pick | Wet pick |
|---|---|---|---|---|---|---|---|---|
| Example | Polym. Ex. | | | | | | | |
| 2 - 1 | 1 | 1700 | 80.0 | 94.0 | 81.3 | 96.5 | 8 | 8 |
| 2 - 2 | 2 | 1690 | 79.9 | 94.1 | 80.9 | 96.3 | 8 | 8 |
| 2 - 3 | 3 | 1710 | 79.9 | 94.2 | 81.0 | 96.4 | 8 | 8 |

TABLE 15-continued

| Application Example | Pigment or Filler | Color viscosity (cps) | Gloss of coated paper | Printed gloss | Brightness (%) | Capacity (%) | Dry pick | Wet pick |
|---|---|---|---|---|---|---|---|---|
| 2 - 4 | 4 | 1680 | 80.0 | 93.7 | 80.6 | 96.2 | 8 | 8 |
| 2 - 5 | 5 | 1720 | 80.0 | 93.8 | 80.4 | 96.1 | 8 | 8 |
| 2 - 6 | 6 | 1690 | 80.1 | 93.7 | 81.4 | 96.2 | 8 | 8 |
| 2 - 7 | 7 | 1700 | 79.8 | 94.0 | 80.8 | 96.0 | 8 | 8 |
| 2 - 8 | 8 | 1720 | 79.9 | 89.7 | 81.0 | 96.2 | 8 | 8 |
| 2 - 9 | 9 | 1680 | 79.7 | 94.0 | 80.8 | 96.0 | 8 | 8 |
| 2 - 10 | 10 | 1710 | 80.1 | 93.7 | 81.2 | 96.5 | 7 | 8 |
| 2 - 11 | 11 | 1700 | 79.8 | 93.9 | 81.1 | 96.4 | 8 | 8 |
| 2 - 12 | 12 | 1730 | 79.9 | 93.7 | 81.1 | 96.3 | 8 | 8 |
| 2 - 13 | 13 | 1570 | 78.2 | 92.7 | 80.5 | 95.6 | 8 | 9 |
| 2 - 14 | 14 | 1610 | 78.7 | 93.0 | 80.6 | 95.9 | 8 | 9 |
| 2 - 15 | 15 | 1620 | 79.2 | 93.0 | 80.6 | 95.9 | 8 | 9 |
| 2 - 16 | 16 | 1820 | 79.7 | 94.1 | 80.9 | 96.4 | 8 | 8 |
| 2 - 17 | 17 | 1510 | 80.0 | 93.9 | 81.4 | 96.5 | 9 | 9 |
| 2 - 18 | 18 | 1680 | 79.8 | 94.0 | 81.3 | 95.8 | 9 | 8 |
| 2 - 19 | 19 | 1610 | 79.8 | 93.8 | 80.3 | 95.1 | 9 | 9 |
| 2 - 20 | 20 | 1490 | 80.2 | 93.9 | 81.5 | 96.6 | 9 | 9 |
| 2 - 21 | 27 | 1670 | 80.2 | 94.2 | 80.5 | 95.3 | 10 | 9 |
| Ref. Ex. | Ref. Ex. | | | | | | | |
| 2 - 1 | 1 | 1790 | 76.5 | 88.5 | 78.5 | 93.9 | 7 | 8 |
| 2 - 2 | 3 | 1810 | 76.9 | 89.0 | 78.9 | 94.5 | 8 | 8 |
| 2 - 3 | 4 | 1790 | 75.9 | 88.6 | 78.6 | 93.7 | 8 | 9 |
| 2 - 4 | 5 | 1980 | 76.9 | 89.1 | 78.9 | 94.1 | 7 | 6 |
| 2 - 5 | 6 | 1730 | 76.6 | 88.3 | 78.3 | 93.7 | 8 | 8 |
| 2 - 6 | 7 | 1680 | 77.7 | 90.1 | 80.1 | 95.0 | 7 | 8 |
| 2 - 7 | 8 | 1800 | 78.0 | 90.0 | 80.2 | 95.1 | 6 | 5 |
| 2 - 8 | 11 | 1710 | 75.9 | 88.3 | 78.2 | 94.0 | 8 | 8 |
| 2 - 9 | 13 | 1910 | 78.1 | 91.9 | 78.9 | 93.7 | 8 | 8 |
| 2 - 10 | 14 | 1810 | 76.9 | 88.5 | 78.0 | 92.1 | 10 | 9 |
| 2 - 11 | TiO$_2$ | 1820 | 71.1 | 88.7 | 81.8 | 97.2 | 8 | 9 |
| 2 - 12 | CaCO$_3$ | 1230 | 69.8 | 88.3 | 77.5 | 93.8 | 8 | 9 |

Evaluation-2

| Formulation | Part |
|---|---|
| UW-90 (Trade mark of a product from EMC Co.) | 60 |
| TP-222HS (Trade mark of a product from Okutama Kogyo Co.) | 30 |
| Pigment or filler | 10 |
| Aron T-40 (Trade mark of a product from Toagosei Chemical Ind.) | 0.09 |
| MS-4600 (Trade mark of a product from Nippon Food Industrial Co.) | 3 |
| Polylac 686 (Trade mark of a product from Mitsui Toatsu Chemicals Inc.) | 13 |
| Solid content of coating fluid | 63% |

The coating fluid was prepared by adding dispersant from Aron T-40 having a solid content of 40% to water and sufficiently dispersing kaolin clay UW-90 and precipitated calcium carbonate TP-222HS with a kaules mixer. Thereafter the same procedures as described in Evaluation-1 were carried out to prepare the coating fluid.

Using an applicator, each of the above obtained coating fluids was applied to wood free paper so as to give a dry coating weight of about 10 g/m$^2$ and then dried at 120° C. for 20 seconds. Thereafter, under such conditions as a roll temperature of 60° C., linear pressure of 100 kg/cm and a speed of 10 m/min, the applied paper was passed once through calender rolls to obtain a coated paper, and its performance was evaluated by the methods described above. Results of evaluation are illustrated in Tables 16(I) and 16(II).

TABLE 16(I)

| Application Example | Pigment or Filler | Color viscosity (cps) | Gloss of coated paper | Printed gloss | Brightness (%) | Capacity (%) | Dry pick | Wet pick |
|---|---|---|---|---|---|---|---|---|
| Example | Polym. Ex. | | | | | | | |
| 3 - 1 | 1 | 1290 | 73.6 | 88.5 | 81.6 | 88.8 | 8 | 8 |
| 3 - 2 | 5 | 1320 | 72.9 | 87.8 | 81.3 | 88.5 | 8 | 8 |
| 3 - 3 | 10 | 1380 | 73.3 | 88.2 | 81.4 | 88.6 | 7 | 6 |
| 3 - 4 | 11 | 1360 | 73.6 | 88.5 | 81.7 | 89.0 | 8 | 8 |
| 3 - 5 | 20 | 1310 | 74.0 | 88.8 | 81.9 | 89.5 | 8 | 8 |
| 3 - 6 | 21 | 1300 | 74.1 | 88.8 | 81.8 | 89.3 | 8 | 8 |
| 3 - 7 | 22 | 1280 | 73.6 | 88.4 | 81.6 | 88.9 | 9 | 8 |
| 3 - 8 | 23 | 1350 | 74.0 | 88.9 | 81.7 | 88.8 | 7 | 6 |
| 3 - 9 | 24 | 1340 | 73.8 | 88.3 | 81.9 | 89.4 | 8 | 8 |
| 3 - 10 | 25 | 1400 | 73.5 | 88.2 | 81.4 | 88.8 | 8 | 8 |
| 3 - 11 | 26 | 1290 | 73.5 | 88.4 | 81.5 | 88.9 | 8 | 8 |
| 3 - 12 | 27 | 1420 | 73.9 | 88.9 | 81.5 | 88.9 | 9 | 8 |
| Ref. Ex. | Ref. Ex. | | | | | | | |
| 3 - 1 | 7 | 1400 | 70.3 | 87.1 | 80.5 | 88.1 | 5 | 4 |
| 3 - 2 | 8 | 1560 | 70.8 | 87.2 | 80.6 | 88.3 | 5 | 5 |
| 3 - 3 | 9 | 1320 | 70.5 | 87.0 | 80.6 | 88.2 | 6 | 5 |
| 3 - 4 | 11 | 1280 | 68.0 | 86.0 | 79.8 | 87.9 | 7 | 6 |
| 3 - 5 | 12 | 1380 | 68.4 | 86.1 | 79.5 | 87.6 | 6 | 6 |
| 3 - 6 | 13 | 1630 | 71.1 | 87.4 | 80.1 | 88.0 | 7 | 6 |

TABLE 16(I)-continued

| Application Example | Pigment or Filler | Color viscosity (cps) | Gloss of coated paper | Printed gloss | Brightness (%) | Capacity (%) | Dry pick | Wet pick |
|---|---|---|---|---|---|---|---|---|
| 3 - 7 | 14 | 1330 | 68.2 | 86.1 | 79.4 | 87.4 | 8 | 6 |
| 3 - 8 | TiO₂ | 1200 | 65.1 | 85.5 | 82.1 | 90.0 | 8 | 8 |
| 3 - 9 | CaCO₃ | 1170 | 63.4 | 85.4 | 78.5 | 87.5 | 8 | 8 |

TABLE 16(II)

| Application Example | Pigment or Filler | Color viscosity (cps) | Gloss of coated paper | Printed gloss | Brightness (%) | Capacity (%) | Dry pick | Wet pick |
|---|---|---|---|---|---|---|---|---|
| Example | Polym. Ex. | | | | | | | |
| 3 - 13 | 28 | 1280 | 73.4 | 88.7 | 81.3 | 88.5 | 8 | 8 |
| 3 - 14 | 29 | 1290 | 73.6 | 88.9 | 81.5 | 88.5 | 8 | 8 |
| 3 - 15 | 31 | 1250 | 72.5 | 87.4 | 81.0 | 88.3 | 8 | 8 |
| 3 - 16 | 34 | 1330 | 73.6 | 88.5 | 81.5 | 88.5 | 8 | 8 |
| 3 - 17 | 35 | 1360 | 73.2 | 88.2 | 81.2 | 88.3 | 7 | 7 |
| 3 - 18 | 36 | 1250 | 73.2 | 88.4 | 81.4 | 88.4 | 9 | 9 |
| 3 - 19 | 37 | 1300 | 73.0 | 88.3 | 81.1 | 88.3 | 8 | 7 |
| 3 - 20 | 39 | 1320 | 73.5 | 88.7 | 81.3 | 88.6 | 8 | 8 |
| 3 - 21 | 46 | 1340 | 73.9 | 88.8 | 81.7 | 88.7 | 8 | 9 |
| 3 - 22 | 48 | 1290 | 74.0 | 88.8 | 81.8 | 88.8 | 8 | 8 |
| 3 - 23 | 49 | 1310 | 73.2 | 88.9 | 81.3 | 88.3 | 9 | 8 |
| 3 - 24 | 50 | 1340 | 73.8 | 88.9 | 81.7 | 88.7 | 9 | 9 |
| Ref. Ex. | Ref. Ex. | | | | | | | |
| 3 - 10 | 15 | 1270 | 68.0 | 86.0 | 79.8 | 87.4 | 7 | 7 |
| 3 - 11 | 17 | 1280 | 68.3 | 86.4 | 80.1 | 87.9 | 7 | 7 |
| 3 - 12 | 18 | 1260 | 68.1 | 86.2 | 79.9 | 87.5 | 7 | 7 |
| 3 - 13 | 22 | 1390 | 70.9 | 87.0 | 80.2 | 88.0 | 7 | 7 |
| 3 - 14 | 23 | 1420 | 71.9 | 87.3 | 80.9 | 88.2 | 5 | 5 |
| 3 - 15 | 24 | 1270 | 68.4 | 86.1 | 80.1 | 87.6 | 7 | 7 |

Evaluation-3

Each of the coating fluids prepared in Evaluation-2 was applied to wood free paper and paper board so as to give a dry coating weight of about 50 g/m² and evaluated on the blocking resistance in hot calender treatment at a temperature of 160° C. under linear pressure of 20 kg/cm.

The coated wood free paper obtained above was evaluated for the blocking resistance in a mini super calender treatment at a temperature of 60° C. under linear pressure of 250 kg/cm.

Evaluation was divided into the following three classes.

○: No blocking and no dirt on the calender rolls were found.

Δ: No blocking and some dirt on the calender rolls were found.

×: Blocking was found.

Results are illustrated in Tables 17(I) and 17(II).

TABLE 17(I)

| Application Example | Emulsion particle | Substrate | Calender treatment 160° C., 20 kg/cm | Calender treatment 60° C., 250 kg/cm |
|---|---|---|---|---|
| Example | Polym. Ex. | | | |
| 4 - 1 | 1 | Wood free paper | ○ | ○ |
| | | Paper board | ○ | — |
| 4 - 2 | 20 | Wood free paper | ○ | ○ |
| | | Paper board | ○ | — |
| 4 - 3 | 27 | Wood free paper | ○ | ○ |
| | | Paper board | ○ | — |
| Ref. Ex. | Ref. Ex. | | | |
| 4 - 1 | 9 | Wood free paper | Δ | Δ |
| | | Paper board | × | — |
| 4 - 2 | 11 | Wood free paper | ○ | ○ |
| | | Paper board | ○ | — |
| 4 - 3 | 13 | Wood free paper | Δ | Δ |
| | | Paper board | × | — |
| 4 - 4 | CaCO₃ | Wood free paper | ○ | ○ |
| | | Paper board | ○ | — |

TABLE 17(II)

| Application Example | Emulsion particle | Substrate | Calender treatment 160° C., 20 kg/cm | Calender treatment 60° C., 250 kg/cm |
|---|---|---|---|---|
| Example | Polym. Ex. | | | |
| 4 - 4 | 28 | Wood free paper | ○ | ○ |
| | | Paper board | ○ | — |
| 4 - 5 | 48 | Wood free paper | ○ | ○ |
| | | Paper board | ○ | — |
| 4 - 6 | 49 | Wood free paper | ○ | ○ |
| | | Paper board | ○ | — |
| Ref. Ex. | Ref. Ex. | | | |
| 4 - 5 | 20 | Wood free paper | ○ | ○ |
| | | Paper board | ○ | — |
| 4 - 6 | 23 | Wood free paper | Δ | Δ |
| | | Paper board | × | — |

Evaluation-4

The formulation of the fillers and the organic pigment in Evaluation-2 were changed to 50 parts of UW-90, 30 parts of TP-222HS and 20 parts of the organic pigment.

The coating fluid thus prepared was applied to wood free paper so as to give a dry coating weight of about 9 g/m² and subjected to calender treatment at a constant temperature of 60° C. under two pressure conditions, that is, once under linear pressure of 50 kg/cm or twice under linear pressure of 100 kg/cm. Properties of coated paper thus obtained were evaluated. Results are illustrated in Tables 18(I) and 18(II).

TABLE 18(I)

| Application Example | Emulsion particle | Evaluation | Calender treatment (60° C.) | | |
|---|---|---|---|---|---|
| | | | untreated | 50 kg/cm | 100 kg/cm |
| 5 - 1 | Polym. Ex. 1 | Brightness (%) | 82.8 | 82.3 | 81.9 |
| | | Opacity (%) | 90.2 | 89.5 | 88.9 |
| | | Gloss of coated paper | 39.4 | 63.8 | 75.5 |
| 5 - 2 | Polym. Ex. 21 | Brightness (%) | 82.9 | 82.5 | 82.1 |
| | | Opacity (%) | 90.5 | 90.0 | 89.4 |
| | | Gloss of coated paper | 39.8 | 64.0 | 75.8 |
| 5 - 3 | Polym. Ex. 27 | Brightness (%) | 82.7 | 82.4 | 81.8 |
| | | Opacity (%) | 90.2 | 89.6 | 88.8 |
| | | Gloss of coated paper | 39.6 | 64.2 | 75.9 |
| 5 - 1 | Ref. Ex. 9 | Brightness (%) | 81.5 | 80.7 | 80.1 |
| | | Opacity (%) | 89.3 | 88.5 | 87.4 |
| | | Gloss of coated paper | 35.0 | 60.1 | 72.7 |
| 5 - 2 | Ref. Ex. 11 | Brightness (%) | 80.6 | 80.1 | 79.7 |
| | | Opacity (%) | 88.6 | 88.0 | 87.4 |
| | | Gloss of coated paper | 30.5 | 58.4 | 69.1 |
| 5 - 3 | Ref. Ex. 13 | Brightness (%) | 81.4 | 80.3 | 79.8 |
| | | Opacity (%) | 89.3 | 88.4 | 87.3 |
| | | Gloss of coated paper | 35.1 | 60.5 | 73.5 |

TABLE 18(II)

| Application Example | Emulsion particle | Evaluation | Calender treatment (60° C.) | | |
|---|---|---|---|---|---|
| | | | untreated | 50 kg/cm | 100 kg/cm |
| 5 - 4 | Polym. Ex. 29 | Brightness (%) | 82.7 | 82.1 | 81.8 |
| | | Opacity (%) | 89.9 | 89.3 | 88.6 |
| | | Gloss of coated paper | 38.9 | 63.5 | 75.3 |
| 5 - 5 | Polym. Ex. 46 | Brightness (%) | 82.8 | 82.4 | 82.0 |
| | | Opacity (%) | 90.4 | 89.9 | 89.1 |
| | | Gloss of coated paper | 39.5 | 63.9 | 75.8 |
| 5 - 6 | Polym. Ex. 50 | Brightness (%) | 82.7 | 82.4 | 81.7 |
| | | Opacity (%) | 90.1 | 89.5 | 88.8 |
| | | Gloss of coated paper | 39.5 | 64.0 | 75.8 |
| 5 - 4 | Ref. Ex. 15 | Brightness (%) | 80.7 | 80.0 | 79.6 |
| | | Opacity (%) | 88.6 | 88.0 | 87.2 |
| | | Gloss of coated paper | 30.2 | 58.0 | 68.8 |
| 5 - 5 | Ref. Ex. 16 | Brightness (%) | 80.8 | 79.9 | 79.4 |
| | | Opacity (%) | 88.8 | 88.1 | 87.1 |
| | | Gloss of coated paper | 30.1 | 58.3 | 69.0 |
| 5 - 6 | Ref. Ex. 23 | Brightness (%) | 81.9 | 80.7 | 80.3 |
| | | Opacity (%) | 89.6 | 88.7 | 87.5 |
| | | Gloss of coated paper | 34.7 | 60.3 | 72.9 |

Example of Resin Composition for Thermal Recording Material

Paper was used as a substrate and particle prepared in Polymerization Examples and Referential Examples was used in the intermediate layer.

(1) Preparation of undercoating compositions

Using the emulsion particles obtained in the above Polymerization Examples, the formulations as illustrated in Tables 19(I) and 19(II) were thoroughly mixed to prepare under coating compositions for use in thermal recording materials.

(2) Preparation of compositions for thermal recording layer

Using a sand mill, fluid A (a color former dispersion) and fluid B (a developer dispersion) were separately prepared according to the following formulations.

| (Fluid A) | |
|---|---|
| | Part |
| 3-Dimethylamino-6-methyl-7-anilinofluoran | 20 |
| 20% Aqueous solution of hydroxyethyl cellulose | 5 |
| Water | 75 |

| (Fluid B) | |
|---|---|
| Ingredient | Parts |
| Bisphenol A | 20 |
| 20% Aqueous solution of hydroxyethyl cellulose | 5 |
| Petrolite R-50 (a microcrystalline wax manufactured by Halico Co.) | 5 |
| Water | 70 |

After fluids A and B were thoroughly dispersed in a sand mill, 15 parts of fluid A, 40 parts of fluid B, parts of calcium carbonate, and 25 parts of a 20% aqueous solution of Polyvinyl Alcohol K-117 (manufactured by Kurare) were mixed and stirred vigorously to obtain a thermal recording layer composition.

Using a bar coater, each of the aforesaid undercoating compositions was applied to commercially available wood free paper (having weight of about 50 g/m²) so as to give a dry coating weight of 15 g/m², and then dried. Subsequently, using a bar coater, the aforesaid thermal recording layer composition was applied thereto so as to give a dry coating weight of about 15 g/m², and then dried to obtain a thermal recording material.

The thermal recording material thus obtained was printed to develop color with thermal printing equipment TH-PMD (Trade mark of Okura Electric Co.) under conditions of applied voltage of 24 V, pulse width of 1.74 ms and applied energy of 0.34 mJ/dot. The color density was measured with a Macbeth densitometer Printing and color development were also carried out under conditions of applied voltage of 27 V, pulse width of 3.0 ms and applied energy of 0.73 mJ/dot. Thereby printability was evaluated. Printability evaluation was divided into the following five classes.

⊙: Sticking and foreign matter adhesion were not found at all.
○: Sticking and foreign matter adhesion were scarcely found.
Δ: Normal
X: Sticking and foreign matter adhesion were found.
XX: Sticking and foreign matter adhesion were considerably found.

Results are illustrated in Tables 19(I) and 19(II).

for paper coating and organic pigments for paints, the formal characteristic can exhibit excellent effects such as hiding power, brightness and gloss without impairing drying ability and strength of coated layers. When the emulsion particle is used for the paper coating agents in particular, blocking resistance is excellent in calender-roll treatment and remarkable decrease in hiding power and brightness due to the deformation of overall particle can also be inhibited.

In these uses, the whole or a portion of titanium dioxide, kaolin, clay and calcium carbonate can be replaced by the emulsion particle of the invention. Additionally, the emulsion particle of the invention is effective for improving lightweight, hardness, wear resistance, heat

TABLE 19(I)

| Application Example | Emulsion particle (wt. part) | | Binder (wt. part) | | Inorganic filler (wt. part) | | Print density | Printability | Brightness |
|---|---|---|---|---|---|---|---|---|---|
| Example | Polym. Ex. | | | | | | | | |
| 6 - 1 | 1 | 80 | PVA | 20 | | | 1.36 | ⊙ | 80.2 |
| 6 - 2 | 2 | 80 | PVA | 20 | | | 1.34 | ○ | 80.5 |
| 6 - 3 | 3 | 80 | PVA | 20 | | | 1.35 | ⊙ | 80.4 |
| 6 - 4 | 4 | 80 | PVA | 20 | | | 1.36 | ⊙ | 80.3 |
| 6 - 5 | 5 | 70 | PVA | 30 | | | 1.30 | ○ | 80.0 |
| 6 - 6 | 6 | 80 | PVA | 20 | | | 1.34 | ⊙ | 80.2 |
| 6 - 7 | 7 | 80 | PVA | 20 | | | 1.35 | ⊙ | 80.5 |
| 6 - 8 | 8 | 75 | PVA | 25 | | | 1.33 | ○ | 80.4 |
| 6 - 9 | 9 | 80 | PVA | 20 | | | 1.38 | ⊙ | 80.4 |
| 6 - 10 | 10 | 80 | PVA | 20 | | | 1.30 | ○ | 80.1 |
| 6 - 11 | 11 | 80 | PVA | 20 | | | 1.37 | ○ | 80.2 |
| 6 - 12 | 12 | 75 | PVA + SVR | 15 + 10 | | | 1.37 | ○ | 80.3 |
| 6 - 13 | 13 | 80 | PVA | 20 | | | 1.40 | ⊙ | 80.2 |
| 6 - 14 | 14 | 70 | SBR | 20 | CaCO$_3$ | 10 | 1.38 | ○ | 80.3 |
| 6 - 15 | 15 | 80 | PVA | 20 | | | 1.34 | ⊙ | 80.5 |
| 6 - 16 | 16 | 70 | PVA | 20 | Calcined clay | 10 | 1.35 | ⊙ | 80.5 |
| 6 - 17 | 17 | 75 | PVA | 20 | | | 1.38 | ⊙ | 80.6 |
| 6 - 18 | 18 | 80 | PVA | 20 | | | 1.35 | ⊙ | 80.1 |
| 6 - 19 | 19 | 70 | PVA | 20 | Calcined clay | 10 | 1.39 | ⊙ | 80.6 |
| Ref. Ex. | Ref. Ex. | | | | | | | | |
| 6 - 1 | 1 | 80 | PVA | 20 | | | 1.02 | Δ | 78.8 |
| 6 - 2 | 3 | 80 | PVA | 20 | | | 1.10 | X | 78.0 |
| 6 - 3 | 4 | 80 | PVA | 20 | | | 1.05 | Δ | 78.6 |
| 6 - 4 | 5 | 80 | PVA | 20 | | | 1.00 | XX | 77.5 |
| 6 - 5 | 6 | 70 | PVA | 30 | | | 1.01 | Δ | 78.6 |
| 6 - 6 | 7 | 80 | PVA | 20 | | | 1.20 | Δ | 79.3 |

PVA: Polyvinyl alcohol (Kuraray; K-117)
SBR: Styrene-butadiene latex (Mitsui Toatsu Chemicals; Polylac 755)
CaCO$_3$: Nippon IPC; Carbital 90
Calcined clay: Engelhardt; SATINTONE No. 5

TABLE 19(II)

| Application Example | Emulsion particle (wt. part) | | Binder (wt. part) | | Inorganic filler (wt. part) | | Print density | Printability | Brightness |
|---|---|---|---|---|---|---|---|---|---|
| Example | Polym. Ex. | | | | | | | | |
| 6 - 20 | 28 | 80 | PVA | 20 | | | 1.33 | ⊙ | 80.0 |
| 6 - 21 | 32 | 70 | PVA | 30 | | | 1.30 | ○ | 79.9 |
| 6 - 22 | 35 | 80 | PVA | 20 | | | 1.29 | ○ | 79.8 |
| 6 - 23 | 39 | 85 | SBR | 15 | | | 1.37 | ⊙ | 80.4 |
| 6 - 24 | 40 | 65 | PVA | 20 | CaCO$_3$ | 15 | 1.37 | ⊙ | 80.3 |
| 6 - 25 | 43 | 80 | PVA | 20 | | | 1.34 | ⊙ | 80.1 |
| 6 - 26 | 45 | 75 | PVA + SBR | 15 + 10 | | | 1.40 | ⊙ | 80.0 |
| 6 - 27 | 47 | 70 | PVA | 20 | Calcined clay | 10 | 1.39 | ⊙ | 80.3 |
| 6 - 28 | 48 | 75 | PVA | 15 | | | 1.37 | ⊙ | 80.4 |
| Ref. Ex. | Ref. Ex. | | | | | | | | |
| 6 - 7 | 16 | 80 | PVA | 20 | | | 1.03 | ○ | 78.6 |
| 6 - 8 | 17 | 50 | SBR | 30 | CaCO$_3$ | 20 | 1.00 | ○ | 78.4 |
| 6 - 9 | 22 | 70 | PVA | 30 | | | 1.21 | X | 79.5 |
| 6 - 10 | 25 | 80 | PVA | 20 | | | 1.25 | Δ | 79.8 |

Effect of the Invention

The cored multi-shell emulsion particle of the invention which has a void layer in the interior of particle in the dry state and further has a core particle in said void layer posses is quite novel in the form. When the emulsion particle is applied, for example, to coating agents resistance and thermal insulation. Hence, the particle can also be used as an additive of various compositions for paper, metal, plastics, fibers and cloth.

Further, thermal recording materials can provide high sensitivity, high brightness and excellent printability by the addition of cored multi-shell emulsion particle of the present invention.

What is claimed is:

1. A cored multi-shell emulsion particle comprising layers of polymers of two different refractive indexes, said particle having a diameter D of from 0.1 to 5.0μ and including therein a polymer core particle and a polymer void layer over the exterior of said core particle, the ratio of the diameter φ of the core particle to D and the ratio of the diameter d of the void layer to D being in the range, respectively:

φ/D=0.1−0.6 d/D=0.2−0.8 wherein D>φ.

2. The emulsion particle of claim 1 wherein the emulsion particle is obtained by forming a core particle consisting of a polymer (A) by conducting emulsion polymerization of a vinyl monomer (a), adding thereto a vinyl monomer (b) which forms a polymer capable of swelling with an alkaline material, conducting emulsion polymerization of monomer (b) to form an exterior void layer consisting of a polymer (B), followed by adding a vinyl monomer (c), conducting emulsion polymerization of vinylmonomer (c) to form a layer of polymer (C) over polymer (B), treating the resulting multilayer structured emulsion particle with an alkaline material to swell the polymer (B) and drying the resulting swelled particle.

3. The emulsion particle of claim 2 wherein prior to drying the swelled particle and after polymer (B) is swelled by treatment with an alkaline material, the particle is mixed with a vinyl monomer (d), and an emulsion polymerization is conducted to form a polymer (D) on the exterior of the particle.

4. The emulsion particle of claim 2 wherein polymer (A) is insoluble in the alkaline material.

5. The emulsion particle of claim 2 wherein vinyl monomer (b) contains at least one monomer selected from the group consisting of an unsaturated carboxylic acid, an unsaturated carboxylic acid anhydride, a vinyl ester compound and an acrylate ester compound having an alkyl group of from 1 to 3 carbon atoms, in a total amount of from 5 to 80% by weight.

6. The emulsion particle of claim 2 wherein vinyl monomer (a) contains at least one monomer selected from the group consisting of an unsaturated carboxylic acid, an unsaturated carboxylic acid anhydride, a vinyl ester compound and an acrylate ester having an alkyl group of from 1 to 3 carbon atoms, in a total amount of 3% by weight or less.

7. The emulsion particle of claim 2 wherein the polymer (C) has a glass transition temperature of 50° C. or above.

8. The emulsion particle of claim 2 wherein the core particle consisting of polymer (A) has a particle diameter of from 0.1 to 1.0μ.

9. The emulsion particle of claim 2 wherein polymer (A) has a refractive index of 1.45 or more.

10. The emulsion particle of claim 3 wherein polymer (D) has an refractive index of 1.48 or more.

11. The emulsion particle of claim 2 wherein polymer (A) has a glass transition temperature of 50° C. or above.

12. The emulsion particle of claim 2 wherein vinyl monomer (a) contains a crosslinking monomer in an amount of from 0.1 to 5% by weight to vinyl monomer (a).

13. The emulsion particle of claim 2 wherein vinyl monomer (a) consists of an aromatic vinyl monomer and a functional monomer, and contains from 0 to 10% by weight of a crosslinking monomer.

14. The emulsion particle of claim 3 wherein vinyl monomer (d) consists of an aromatic vinyl monomer and a functional monomer and contains from 0 to 20% by weight of a crosslinking monomer.

15. The emulsion particle of claim 3 wherein the vinyl monomer (d) is a mixture of an aromatic vinyl monomer with butadiene and a functional monomer.

16. The emulsion particle of claim 5 wherein the unsaturated carboxylic acid contained in the vinyl monomer (b) is one or both of acrylic acid and methacrylic acid.

17. The emulsion particle of claim 5 wherein vinyl ester compound in vinyl monomer (b) is vinyl acetate.

18. The emulsion particle of claim 5 wherein the acrylate ester having the alkyl group of from 1 to 3 carbon atoms in vinyl monomer (b) is methyl acrylate.

19. The emulsion particle of claim 2 wherein vinyl monomer (c) contains at least one monomer selected from the group consisting of unsaturated carboxylic acid, an unsaturated carboxylic acid anhydride, a vinyl ester compound and an acrylate ester having an alkyl group of from 1 to 3 carbon atoms, in a total amount of 10% by weight or less.

20. The emulsion particle of claim 3 wherein the refractive index of polymer (C) is lower than the refractive index of both polymer (A) and of polymer (D)

21. A resin composition for paper coating comprising a cored multi-shell emulsion particle in accordance with claim 1, said emulsion particle including therein a core particle and a void layer which exists in the exterior of said core particle.

22. A resin composition for paints comprising a cored multi-shell emulsion particle in accordance with claim 1, said emulsion particle including therein a core particle and a void layer which exists in the exterior of said core particle.

23. A resin composition for thermal recording materials comprising a cored multi-shell emulsion particle in accordance with claim 1, said emulsion particle including therein a core particle and a void layer which exists in the exterior of said core particle.

24. The emulsion of claim 1 wherein the core particle is formed from a polymer (A), having a refractive index of 1.45 or more of, a vinyl monomer (a) comprising at least one monomer selected from the group consisting of an unsaturated carboxylic acid, an unsaturated carboxylic acid anhydride, a vinyl ester compound and an acrylate ester having an alkyl group of from 1 to 3 carbon atoms; in a total amount of 3% by weight or less; wherein vinyl monomer (b) contains at least one monomer selected from the group consisting of an unsaturated carboxylic acid, an unsaturated carboxylic acid anhydride, a vinyl ester compound and an acrylate ester compound having an alkyl group of from 1 to 3 carbon atoms, in a total amount of from 5 to 80% by weight; wherein polymer (B) is covered by a layer of a polymer (C) of vinyl monomer (c) which is different from vinyl polymer (b) and has a refractive index differing therefrom; wherein the layer of polymer (C) is covered by an outer layer of a polymer (D) having a refractive index of 1.48 or more deposited on the layer of polymer (C) while polymer (B) and its coating of polymer (C) are in an alkaline swollen state, vinyl monomer; and wherein the refractive index of polymer (C) is lower than the refractive index of both polymer (A) and of polymer (D).

25. The emulsion particle of claim 24, wherein the particle has a diameter of from 0.1 to 1.0μ; wherein polymer (A) is alkaline insoluble and has a glass transition temperature of 50° C. or above; wherein vinyl monomer (a) consists of an aromatic vinyl monomer and a functional group-containing monomer, and contains from 0 to 10% by weight of a crosslinking monomer; wherein vinyl monomer (d) consists of an aromatic vinyl monomer and a functional monomer and contains from 0 to 20% by weight of a crosslinking monomer and is a mixture of an aromatic vinyl monomer with butadiene and a functional group-containing monomer; and wherein the unsaturated carboxylic acid contained in vinyl monomer (b) is one or both of acrylic acid and methacrylic acid and the vinyl ester compound in vinyl monomer (b) is vinyl acetate; wherein the acrylate ester having the alkyl group of from 1 to 3 carbon atoms in vinyl monomer (b) is methyl acrylate; wherein vinyl monomer (c) contains at least one monomer selected from the group consisting of an unsaturated carboxylic acid, an unsaturated carboxylic acid anhydride, a vinyl ester compound and a acrylate ester having an alkyl group of from 1 to 3 carbon atoms, in a total amount of 10% by weight or less.

* * * * *